(12) United States Patent
Hong et al.

(10) Patent No.: US 11,841,420 B2
(45) Date of Patent: Dec. 12, 2023

(54) SYSTEM AND METHOD FOR RADAR-BASED LOCALIZATION AND/OR MAPPING

(71) Applicant: Oculii Corp., Beavercreek, OH (US)

(72) Inventors: Lang Hong, Beavercreek, OH (US); Steven Hong, Beavercreek, OH (US)

(73) Assignee: Oculii Corp., Beavercreek, OH (US)

( * ) Notice: Subject to any disclaimer, the term of this patent is extended or adjusted under 35 U.S.C. 154(b) by 37 days.

(21) Appl. No.: 17/527,596

(22) Filed: Nov. 16, 2021

(65) Prior Publication Data

US 2023/0305141 A1 Sep. 28, 2023

Related U.S. Application Data

(60) Provisional application No. 63/114,414, filed on Nov. 16, 2020.

(51) Int. Cl.
| | | |
|---|---|---|
| G01S 13/89 | (2006.01) | |
| G01S 13/86 | (2006.01) | |
| G01S 7/41 | (2006.01) | |
| G01S 13/42 | (2006.01) | |
| G01S 13/931 | (2020.01) | |
| G01S 13/58 | (2006.01) | |
| G01S 7/00 | (2006.01) | |

(52) U.S. Cl.
CPC ............. *G01S 13/89* (2013.01); *G01S 7/003* (2013.01); *G01S 7/412* (2013.01); *G01S 13/42* (2013.01); *G01S 13/584* (2013.01); *G01S 13/86* (2013.01); *G01S 13/865* (2013.01); *G01S 13/867* (2013.01); *G01S 13/931* (2013.01)

(58) Field of Classification Search
CPC .......... G01S 13/89; G01S 7/003; G01S 7/412; G01S 13/42; G01S 13/584; G01S 13/86; G01S 13/865; G01S 13/867; G01S 13/931
USPC ....................................................... 342/25 F
See application file for complete search history.

(56) References Cited

U.S. PATENT DOCUMENTS

| | | |
|---|---|---|
| 3,691,560 A | 9/1972 | Hammack |
| 3,978,482 A | 8/1976 | Williams et al. |

(Continued)

FOREIGN PATENT DOCUMENTS

| | | |
|---|---|---|
| CN | 206515399 U | 9/2017 |
| EP | 3816665 A1 | 5/2021 |

(Continued)

OTHER PUBLICATIONS

Gonzalez, Hector A., et al., "Doppler Ambiguity Resolution for Binary-Phase-Modulated MIMO FMCW Radars, 2019 International Radar Conference, Sep. 23-27, 2019."

(Continued)

*Primary Examiner* — Vladimir Magloire
*Assistant Examiner* — Alexander L. Syrkin
(74) *Attorney, Agent, or Firm* — Christopher P. Maiorana, PC

(57) ABSTRACT

A method for radar-based localization and/or mapping, preferably including receiving sensor data, determining egospeed, and/or determining egorotation. The method can optionally include performing simultaneous localization and mapping. A system for radar-based localization and/or mapping, preferably including one or more radar sensors, and optionally including one or more vehicles and/or auxiliary sensors (e.g., coupled to the radar sensors).

21 Claims, 16 Drawing Sheets

(56) References Cited

U.S. PATENT DOCUMENTS

| | | | |
|---|---|---|---|
| 4,042,927 A | 8/1977 | Helms | |
| 4,084,158 A | 4/1978 | Slawsby | |
| 4,246,585 A | 1/1981 | Mailloux | |
| 4,544,927 A | 10/1985 | Kurth et al. | |
| 4,546,355 A | 10/1985 | Boles | |
| 4,717,916 A | 1/1988 | Adams et al. | |
| 4,723,124 A | 2/1988 | Boles | |
| 4,794,395 A | 12/1988 | Cindrich et al. | |
| 4,996,532 A | 2/1991 | Kirimoto et al. | |
| 5,218,359 A | 6/1993 | Minamisono | |
| 5,225,839 A | 7/1993 | Okurowski et al. | |
| 5,278,757 A | 1/1994 | Hoctor et al. | |
| 5,847,673 A | 12/1998 | DeBell | |
| 5,945,926 A | 8/1999 | Ammar et al. | |
| 7,535,409 B1 | 5/2009 | Choe et al. | |
| 7,609,198 B2 | 10/2009 | Chang | |
| 8,269,137 B2 | 9/2012 | Ehrmann et al. | |
| 8,312,771 B2 | 11/2012 | Randall et al. | |
| 8,482,455 B2 | 7/2013 | Kemkemian et al. | |
| 9,103,671 B1 | 8/2015 | Breed et al. | |
| 9,470,782 B2 | 10/2016 | Millar et al. | |
| 9,541,638 B2 | 1/2017 | Jansen et al. | |
| 9,869,762 B1 | 1/2018 | Alland et al. | |
| 10,048,366 B1 | 8/2018 | Hong et al. | |
| 10,359,512 B1* | 7/2019 | Hong | G01S 13/878 |
| 10,509,119 B2 | 12/2019 | Hong et al. | |
| 2002/0180636 A1 | 12/2002 | Lin et al. | |
| 2004/0178951 A1 | 9/2004 | Ponsford et al. | |
| 2007/0013575 A1 | 1/2007 | Lee et al. | |
| 2007/0285315 A1 | 12/2007 | Davis et al. | |
| 2008/0122681 A1 | 5/2008 | Shirakawa | |
| 2008/0159416 A1 | 7/2008 | Melick et al. | |
| 2008/0250875 A1 | 10/2008 | Khosla et al. | |
| 2008/0291077 A1 | 11/2008 | Chang | |
| 2009/0135046 A1 | 5/2009 | Steele et al. | |
| 2009/0174590 A1 | 7/2009 | Huizing et al. | |
| 2009/0201206 A1 | 8/2009 | Li et al. | |
| 2009/0231181 A1 | 9/2009 | Yannone | |
| 2010/0019954 A1 | 1/2010 | Mizutani et al. | |
| 2010/0156701 A1 | 6/2010 | Shirakawa | |
| 2010/0194629 A1 | 8/2010 | Craig et al. | |
| 2010/0220001 A1 | 9/2010 | Longstaff | |
| 2010/0328157 A1 | 12/2010 | Culkin et al. | |
| 2011/0050500 A1 | 3/2011 | Shirakawa | |
| 2011/0241928 A1 | 10/2011 | Oswald et al. | |
| 2011/0298676 A1 | 12/2011 | Yanagihara et al. | |
| 2012/0001791 A1 | 1/2012 | Wintermantel | |
| 2012/0112954 A1 | 5/2012 | Kurono et al. | |
| 2012/0268309 A1 | 10/2012 | Samuel et al. | |
| 2012/0299773 A1 | 11/2012 | Stirling-Gallacher et al. | |
| 2013/0069818 A1 | 3/2013 | Shirakawa et al. | |
| 2013/0120191 A1 | 5/2013 | Zhang et al. | |
| 2013/0300596 A1 | 11/2013 | Shirakawa | |
| 2014/0197984 A1 | 7/2014 | Wang et al. | |
| 2014/0266898 A1 | 9/2014 | Linnenbrink | |
| 2015/0102954 A1 | 4/2015 | Hong | |
| 2015/0270609 A1 | 9/2015 | Jin | |
| 2016/0069994 A1 | 3/2016 | Allen et al. | |
| 2016/0228010 A1* | 8/2016 | Kim | A61B 5/021 |
| 2016/0291130 A1 | 10/2016 | Ginsburg et al. | |
| 2017/0031013 A1 | 2/2017 | Halbert et al. | |
| 2017/0082730 A1 | 3/2017 | Kishigami et al. | |
| 2017/0141454 A1 | 5/2017 | Welle | |
| 2017/0212213 A1 | 7/2017 | Kishigami | |
| 2017/0315229 A1 | 11/2017 | Pavek et al. | |
| 2018/0024235 A1 | 1/2018 | Hong et al. | |
| 2018/0088221 A1* | 3/2018 | Yomo | G01S 7/003 |
| 2018/0088224 A1 | 3/2018 | Kishigami | |
| 2018/0356517 A1 | 12/2018 | Cieslar et al. | |
| 2019/0018128 A1 | 1/2019 | Shollenberger | |
| 2019/0049572 A1* | 2/2019 | Hong | G01S 13/584 |
| 2019/0212430 A1 | 7/2019 | Akamine et al. | |
| 2019/0265347 A1 | 8/2019 | Wintermantel | |
| 2019/0293787 A1 | 9/2019 | Sakai et al. | |
| 2019/0318206 A1 | 10/2019 | Smith et al. | |
| 2019/0324133 A1 | 10/2019 | Hong et al. | |
| 2019/0339374 A1 | 11/2019 | Kageme et al. | |
| 2019/0386712 A1 | 12/2019 | Fang | |
| 2020/0025914 A1 | 1/2020 | Li et al. | |
| 2020/0081110 A1 | 3/2020 | Nam et al. | |
| 2020/0132850 A1 | 4/2020 | Crouch et al. | |
| 2020/0191930 A1 | 6/2020 | Yunck | |
| 2020/0191939 A1 | 6/2020 | Wu et al. | |
| 2020/0191940 A1 | 6/2020 | Wu et al. | |
| 2020/0200892 A1 | 6/2020 | Rajab et al. | |

FOREIGN PATENT DOCUMENTS

| | | | | |
|---|---|---|---|---|
| JP | 2004189177 A | * | 7/2004 | |
| JP | 2008292264 A | | 12/2008 | |
| JP | 2013068433 A | | 4/2013 | |
| KR | 2017007146 A | * | 1/2017 | B60W 10/18 |
| WO | 2019215734 A1 | | 11/2019 | |

OTHER PUBLICATIONS

Holder, Martin, et al., "Real-Time Graph SLAM based on Radar", IEEE Intelligent Vehicles Symposium (IV), Paris, France, Jun. 9-12, 2019.

Hott, Maurice, et al., "Joint Super-Resolution and Array Interpolation for MIMO Radar Virtual Arrays", Proceedings of the 15th European Radar Conference, Sep. 26-28, 2018, Madrid, Spain.

Kellner, Dominik, et al., "Instantaneous Ego-Motion Estimation using Multiple Doppler Radars", 2014 IEEE International Conference on Robotics & Automation (ICRA) Hong Kong Convention and Exhibition Center May 31-Jun. 7, 2014, Hong Kong, China.

Li, et al., "Target Tracking in Uncertain Multipath Environment using Distributed Angle-of-Arrival Observation", retrieved from online on Apr. 4, 201 (Apr. 4, 2018); retrieved form URL:http://ieeexplore.ieee.org/document/7131228, Lupfer, Stefanie, et al., "Increasing FastSLAM Accuracy for Radar Data by Integrating the Doppler Information", 2017 IEEE MIT-S International Conference on Microwaves for Intelligent Mobility (ICMIM).

Rapp, Matthias, et al., "A Fast Probablistic Ego-Motion Estimation Framework for Radak", 2015 European Conference on Mobile Robotics.

Sun, Hongbo, et al., "Analysis and Comparison of MIMO Radar Waveforms", 2014 International Radar Conference, Oct. 13-17, 2014.

* cited by examiner

SYSTEM AND METHOD FOR RADAR-BASED LOCALIZATION AND/OR MAPPING

CROSS-REFERENCE TO RELATED APPLICATIONS

This application claims the benefit of U.S. Provisional Application Ser. No. 63/114,414, filed on 16 Nov. 2020, which is incorporated in its entirety by this reference.

TECHNICAL FIELD

This invention relates generally to the radar field, and more specifically to a new and useful system and method for radar-based localization and/or mapping.

BACKGROUND

Typical radar-based approaches to performing localization and/or mapping, such as performing simultaneous localization and mapping (SLAM), use radar Doppler information from stationary objects in an environment surrounding a radar sensor to determine only the velocity of the radar sensor. Accordingly, such approaches require multiple radar sensors in order to fully determine the motion of a sensor platform, and can be limited in the accuracy and/or latency with which they do so. Thus, there is a need in the radar field to create a new and useful system and method for radar-based localization and/or mapping.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
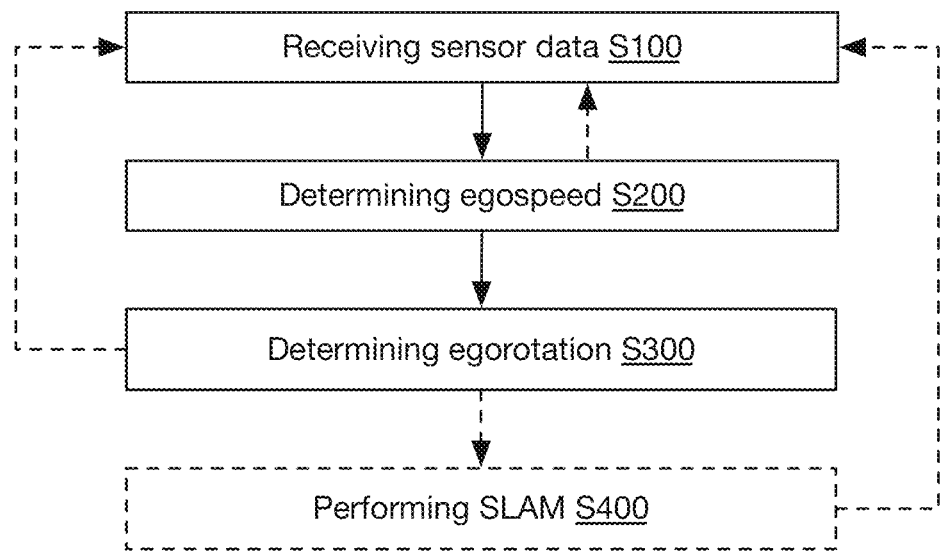
FIG. 1A is a schematic representation of an embodiment of a method for radar-based localization and/or mapping.

A method 100 for radar-based localization and/or mapping preferably includes one or more of receiving sensor data S100, determining egospeed S200, and/or determining egorotation S300; and can optionally include performing simultaneous localization and mapping (SLAM) S400 (e.g., as shown in FIG. 1A). However, the method can additionally or alternatively include any other suitable elements performed in any suitable manner.

Figure 2A:
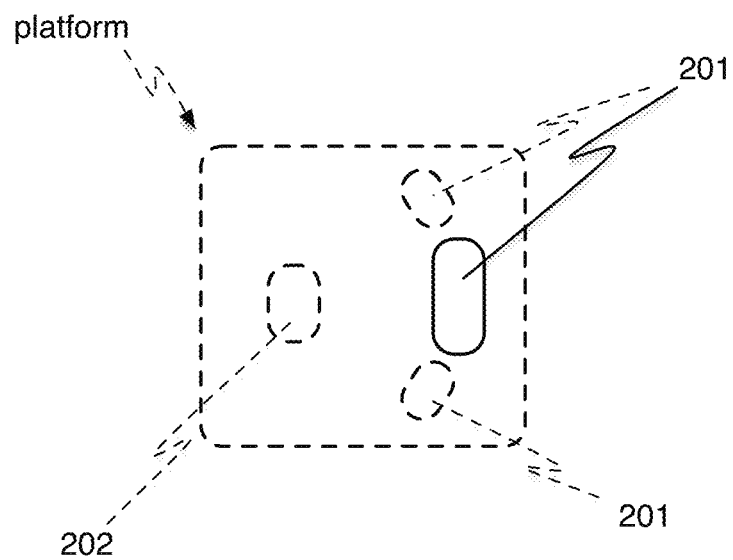
FIGS. 2A-2B are schematic representations of an embodiment of a system for radar-based localization and/or mapping and an example of the embodiment, respectively.

The method 100 is preferably performed using a system 200 for radar-based localization and/or mapping (e.g., the system described below). The system preferably includes one or more radar sensors 201, and can optionally include one or more auxiliary sensors 202 (e.g., coupled to the radar sensors) and/or any other suitable elements (e.g., as shown in FIG. 2A). However, the method can additionally or alternatively be performed using any other suitable system.

2. Benefits

The method and/or system can confer one or more benefits. First, in some embodiments, the method and/or system can enable and/or improve LOCALIZATION AND/OR MAPPING processes performed based only on radar data. For example, radar data can be used both to provide point cloud data (e.g., for point matching) and to provide pose (position and orientation) and/or motion (e.g., velocity, rotation rate, etc.) data, such as data determined as described below regarding the method (e.g., regarding S200 and/or S300).

Second, in some embodiments, the method and/or system can enhance LOCALIZATION AND/OR MAPPING processes performed based on multiple kinds of sensors (e.g., using data from both radar sensors and auxiliary sensors). For example, derivatives of the radar data (e.g., associated with point clouds and/or with pose and motion, such as described above regarding the first benefit) can be combined with data associated with auxiliary sensors, thereby increasing accuracy, precision, and/or reliability of the overall LOCALIZATION AND/OR MAPPING process and/or otherwise enhancing its performance.

Further, some embodiments can implement advanced 'A.I.' techniques that can greatly enhance radar performance (e.g., with respect to interference mitigation, resolution, latency, overall performance, etc.), as compared with comparable hardware (e.g., hardware having similar complexity, bill of materials, and/or cost, etc.) implementing more traditional radar techniques.

However, the method and/or system can additionally or alternatively confer any other suitable benefits.

3. System

The system 200 for radar-based LOCALIZATION AND/OR MAPPING preferably includes one or more radar sensors 201. In examples, each radar sensor 201 can include one or more transmitter arrays 210, receiver arrays 220, and/or signal processors 240 (e.g., as shown in FIGS. 2C-2D). In some embodiments, one or more of the radar sensors can include elements such as described in one or more of: U.S. patent application Ser. No. 16/800,906, filed 25 Feb. 2020 and titled "Systems and Methods for Doppler-Enhanced Radar Tracking", U.S. patent application Ser. No. 15/900,682, filed 20 Feb. 2018 and titled "Systems and Methods for 4-Dimensional Radar Tracking", U.S. patent application Ser. No. 16/149,369, filed 2 Oct. 2018 and titled "Systems and Methods for Stereo Radar Tracking", U.S. patent application Ser. No. 16/704,409, filed 5 Dec. 2019 and titled "Systems and Methods for Interpolated Virtual Aperture Radar Tracking", U.S. Patent Application 62/958,920, filed 9 Jan. 2020 and titled "Systems and Methods for Phase-Modulated Radar Detection", and/or U.S. Patent Application 63/034,514, filed 4 Jun. 2020 and titled "Systems and Methods for Virtual Doppler and/or Aperture Enhancement", each of which is herein incorporated in its entirety by this reference. In some examples, the system implements advanced 'A.I.' techniques that can greatly enhance radar performance, as compared with comparable hardware (e.g., hardware having similar complexity, bill of materials, and/or cost, etc.) implementing more traditional radar techniques.

The transmitter array 210 preferably functions to transmit a signal that, after reflection by a target, can provide information about the target (e.g., relative location, velocity, etc.). The transmitter array 210 preferably transmits a frequency shift keyed (FSK) RADAR signal or a frequency-modified continuous wave (FMCW) RADAR signal, but the transmitter array 210 can additionally or alternatively transmit other electromagnetic signals (e.g., radio waves for RADAR; infrared, visible, and/or UV waves for LIDAR; etc.), sound signals (e.g., for SONAR), and/or any other suitable signals.

The transmitter array 210 preferably includes a plurality of transmitter elements (e.g., transmitter antennas). These elements can include: a single transmitter paired to multiple antennas, such as antennas spaced in a particular pattern and/or with antennas coupled to phase shifters and/or time delays; multiple transmitters, each paired to a single antenna; multiple transmitters, some or all paired to multiple antennas (e.g., as described above regarding the single transmitter), with the remaining transmitters preferably each paired to a single antenna; and/or any other suitable transmitter configurations. For example, a transmitter 210 may include transmitter elements spaced by a distances substantially greater (e.g., greater by more than a threshold factor, such as more than 2, 2.5, 3, 4, 5, or 10 times greater) than a distance between receiver elements (e.g., distance between closest receiver elements, average distance between neighboring receiver elements, etc.).

One or more of the transmitter elements (preferably each transmitter element of the system) can include (e.g., be associated with) one or more phase control elements. In some embodiments, the phase control elements include one or more phase inverters (e.g., configured to controllably impose a 180° phase shift on a transmitter signal). The phase control elements can additionally or alternatively include one or more phase shifters (e.g., configured to control a phase shift imposed on the transmitter signal within a phase shifter range, such as ±5°, 10°, 30°, 90° or 180°, etc.). Although the phase shifter is preferably configured to impose phase shifts substantially independent of frequency, the phase control elements can additionally or alternatively include delay elements (e.g., delay lines) and/or any other suitable elements that impose a frequency-dependent phase shift. Additionally or alternatively, the phase control elements can include elements configured to change one or more aspects of the signal driving the transmitter, such as chirp bandwidth, start and/or end frequency (e.g., lowest or highest frequency of a chirp), idle time, and/or any other suitable aspects (e.g., aspects that will result in a phase shift).

The receiver array 220 preferably functions to receive reflections of the probe signal(s) transmitted by the transmitter 210. The receiver array 220 preferably determines phase, magnitude, and/or frequency information from reflected probe signals, but the receiver array 220 can additionally or alternatively determine any available characteristics of the reflected probe signals.

The receiver array 220 preferably includes a plurality of receiver elements 221 (e.g., receiver antennas), more preferably including a set of receiver elements 221 arranged in a pattern (e.g., along a horizontal or vertical axis, within a plane, etc.). The set of receiver elements 221 can include a single receiver paired to multiple antennas, such as antennas spaced in a particular pattern and/or with antennas coupled to phase shifters and/or time delays; multiple receivers, each paired to a single antenna; multiple receivers, some or all paired to multiple antennas (e.g., as described above regarding the single receiver), with the remaining receivers preferably each paired to a single antenna; and/or any other suitable receiver configurations.

Figure 8A:
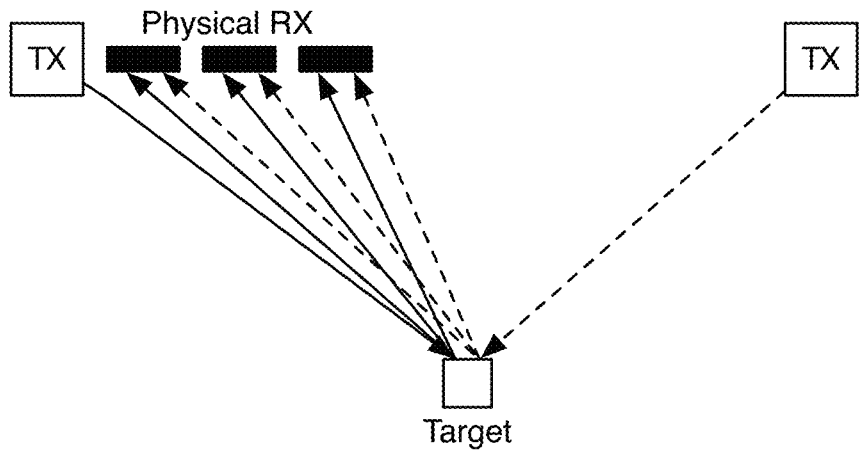
FIGS. 8A-8C are schematic representations of a first example of virtual aperture radar tracking, depicting a physical aperture, a pre-interpolation virtual aperture, and a post-interpolation virtual aperture, respectively.
Figure 8B:
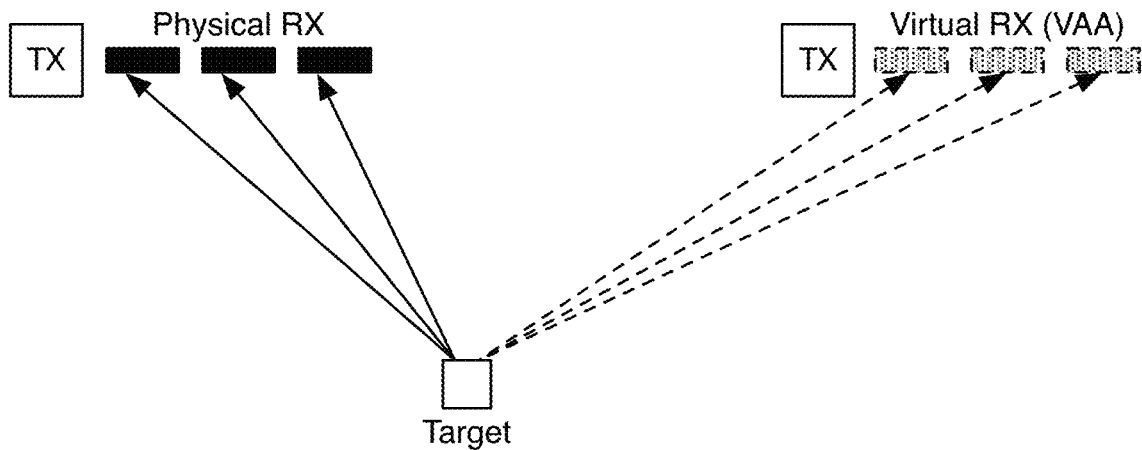
Figure 8C:
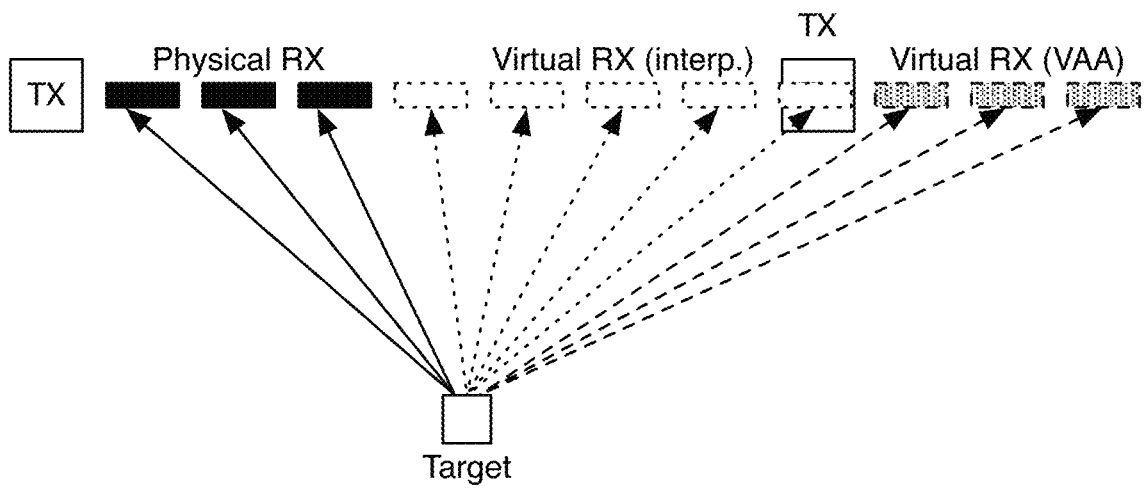
Figure 9A:
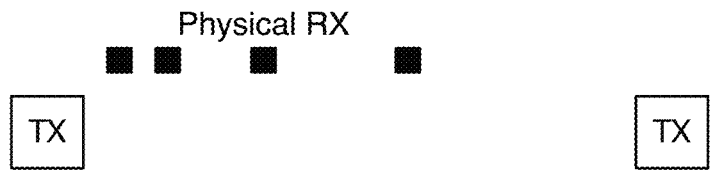
FIGS. 9A-9C are schematic representations of a second example of virtual aperture radar tracking, depicting a physical aperture, a pre-interpolation virtual aperture, and a post-interpolation virtual aperture, respectively.
Figure 9B:
Figure 9C:
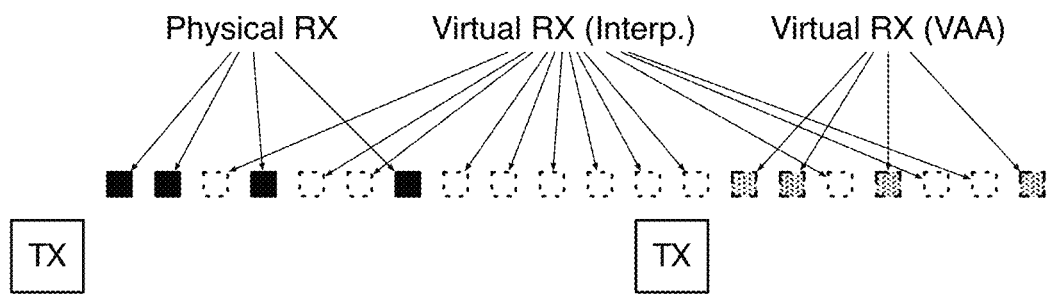
Figure 10A:
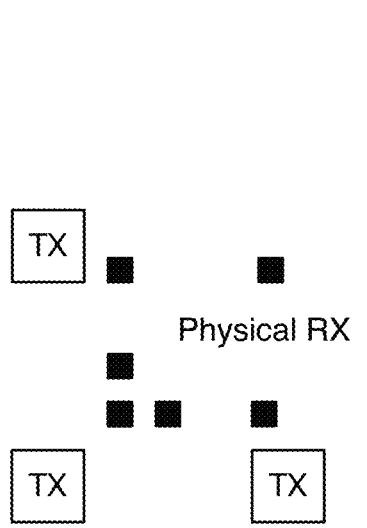
FIGS. 10A-10C are schematic representations of a third example of virtual aperture radar tracking, depicting a physical aperture, a pre-interpolation virtual aperture, and a post-interpolation virtual aperture, respectively.
Figure 10B:
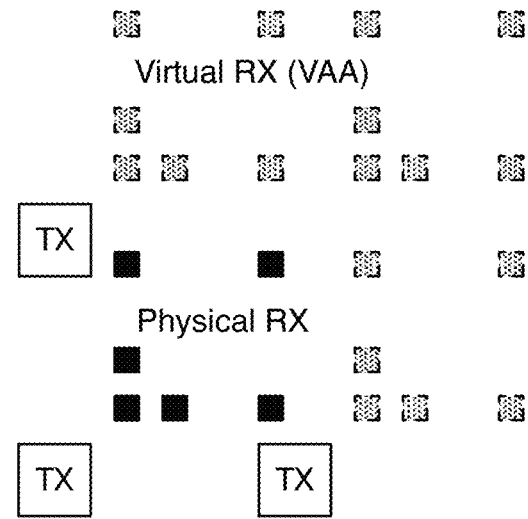
Figure 10C:
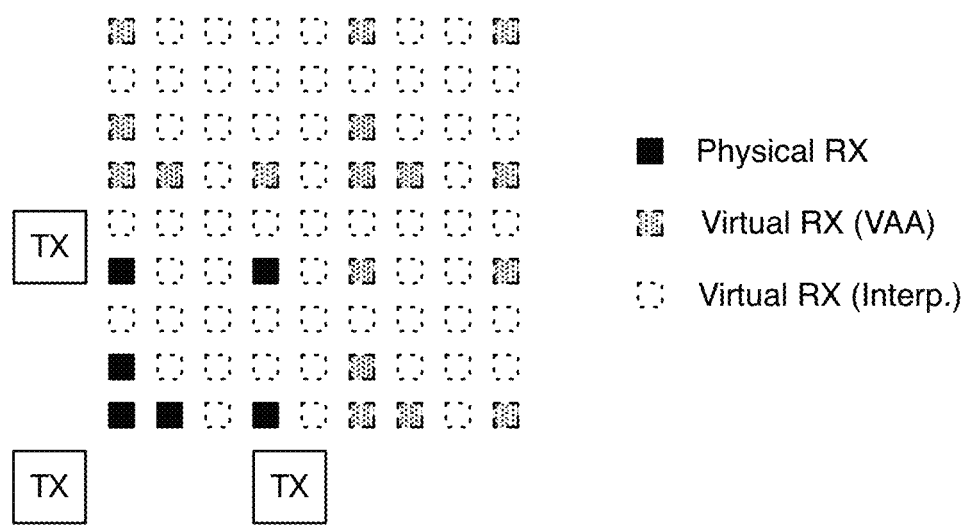
Figure 11A:
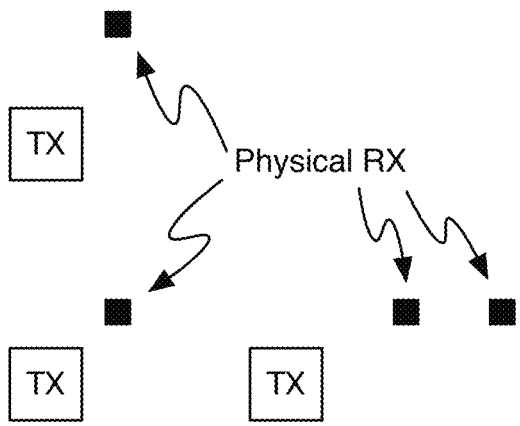
FIGS. 11A-11B are schematic representations of a fourth example of virtual aperture radar tracking, depicting a physical aperture and a post-interpolation virtual aperture, respectively.
Figure 11B:
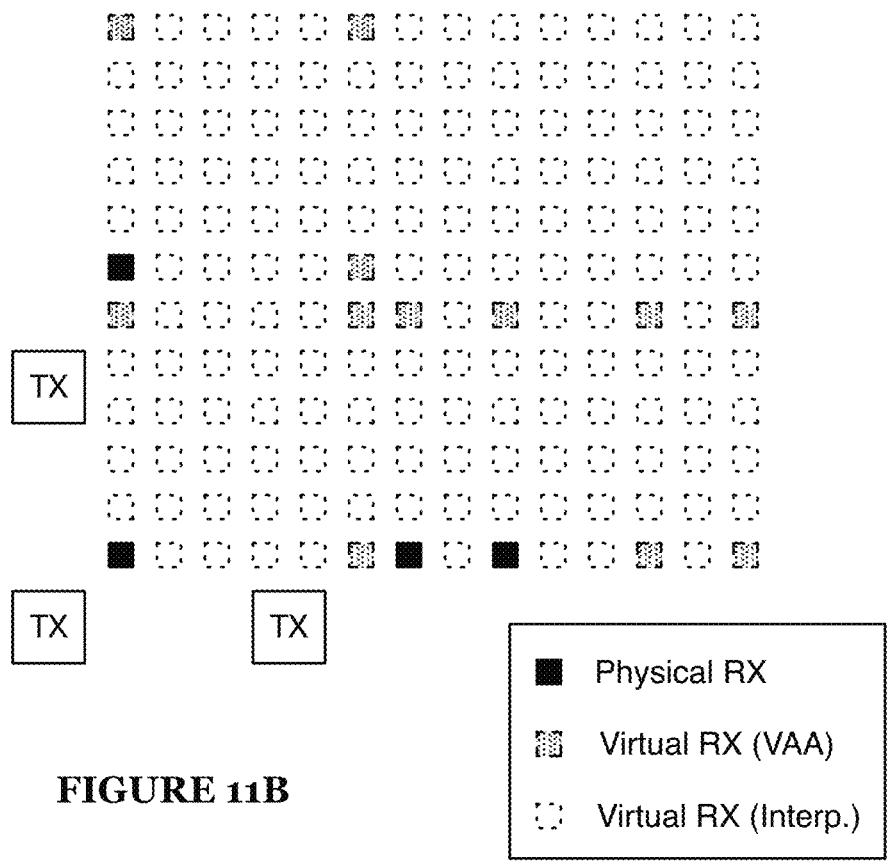
Figure 12A:
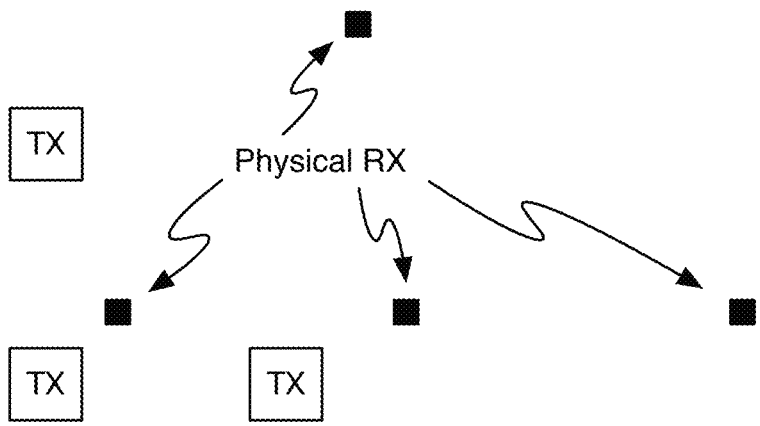
FIGS. 12A-12B are schematic representations of a fifth example of virtual aperture radar tracking, depicting a physical aperture and a post-interpolation virtual aperture, respectively.
Figure 12B:
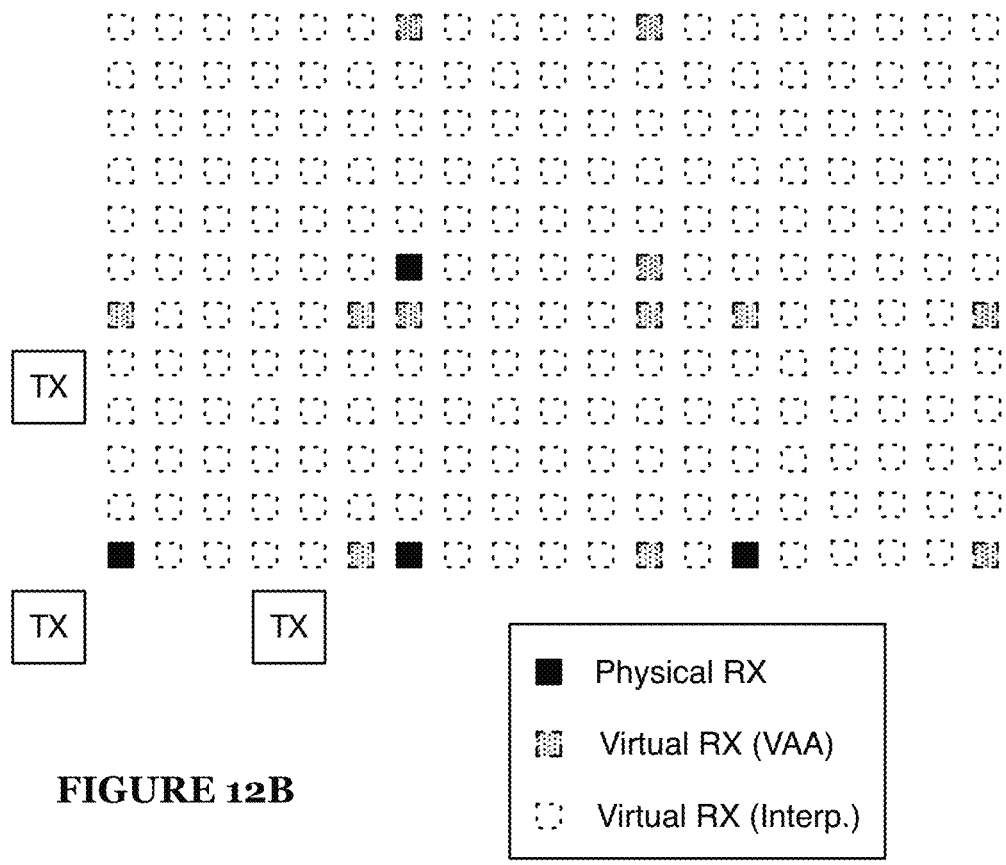
Figure 13A:
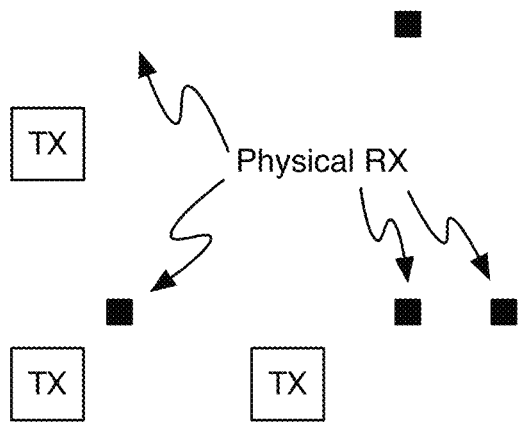
FIGS. 13A-13B are schematic representations of a sixth example of virtual aperture radar tracking, depicting a physical aperture and a post-interpolation virtual aperture, respectively.
Figure 13B:
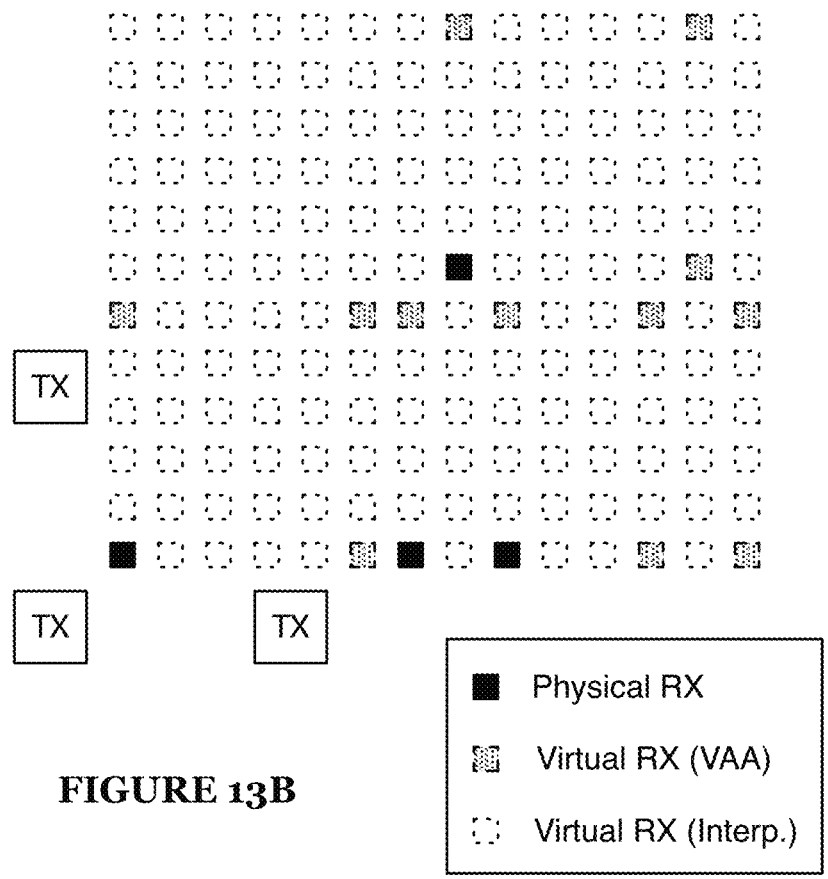

For each array (e.g., each transmitter array 210 and/or each receiver array 220), some or all element pairs (e.g., pairs of transmitter antennas for the transmitter array, pairs of receiver antennas for the receiver array) preferably have a spacing substantially equal to (and/or less than) $\lambda/2$ (wherein $\lambda$ is the radio wavelength transmitted by the transmitters). This $\lambda/2$ spacing can be a spacing between physical elements (e.g., as shown in FIGS. 8A, 9A, and/or 10A), between a physical element and a virtual (e.g., VAA/MIMO) element (e.g., as shown in FIGS. 11B, 12B, and/or 13B; wherein analysis techniques such as described below regarding S130 can be used to achieve alignment between such elements), between virtual elements, and/or between any other suitable elements. In examples in which the array is multidimensional (e.g., planar, including both horizontal and vertical elements, etc.), the array preferably includes, for each dimension of the array (e.g., for a planar array, horizontal and vertical), one or more element pairs with a $\lambda/2$ spacing along that dimension; such pairs are more preferably substantially aligned along the other dimension(s) (e.g., as shown in FIGS. 10A, 11B, and/or 12B), but can additionally or alternatively include pairs with a $\lambda/2$ spacing along multiple dimensions (e.g., as shown in FIG. 13B) and/or with any other suitable spacing along the other dimension(s). However, the arrays can additionally or alternatively include elements with any other suitable spacing. The elements of some or all of the arrays can be arranged in linear (or substantially linear) arrangements, arranged in planar (or substantially planar) arrangements, arranged substantially along a surface (e.g., cylindrical surface, spherical surface, conical surface, etc.), arranged throughout a volume, and/or have any other suitable arrangement. The transmitter and receiver arrays (and/or aspects thereof, such as primary axes, etc.) can be arranged linearly, orthogonally, parallel, at oblique angles, skew, co-planar, and/or have any suitable arrangement relative to each other. Some example arrangements are shown in FIGS. 6, 7, 8A, 9A, 10A, 11A, 12A, and 13A.

The arrangement of the transmitter and receiver arrays (e.g., direction and/or distance between the different transmitters and/or receivers) is preferably known. The arrangement is preferably fixed (or substantially fixed), such as wherein the transmitters and receivers of the arrays are rigidly coupled to each other. However, the arrangement can alternatively be changeable and/or changing. In some embodiments, different sets of receivers can be associated with each transmitter. The sets can be overlapping sets, disjoint sets, or have any other suitable relationship. In some such embodiments, the different sets of receivers can move independently from each other (e.g., wherein the arrangement of receivers within a set is fixed, but the arrangement of the different sets with respect to one another can vary). However, the transmitters and/or receivers can additionally or alternatively define any other suitable spatial arrangements.

The signal processor 240 preferably functions to analyze information received from other elements of the system 200, such as information determined, sampled, and/or otherwise collected by the transmitter array 210, receiver array 220, and/or velocity sensing module 250. The signal processor can additionally or alternatively function to control configuration and/or operation of one or more elements of the system 200. In examples, the signal processor 240 can: control transmission and/or receipt of probe signals (e.g., as described below regarding S110 and/or S120), analyze and/or store received probe signals (e.g., as described below regarding S130), calculate tracking parameters (e.g., as described in U.S. patent application Ser. No. 16/704,409, filed 5 Dec. 2019 and titled "Systems and Methods for Interpolated Virtual Aperture Radar Tracking", and/or in U.S. Provisional Patent Application 62/958,920, filed 9 Jan. 2020 and titled "Systems and Methods for Phase-Modulated Radar Detection", each of which is herein incorporated in its entirety by this reference; such as described in U.S. patent application Ser. No. 16/704,409 regarding calculating initial tracking parameters S130, refining the initial tracking parameters S140, and/or modifying probe signal characteristics S150; and/or such as described in U.S. Provisional Patent Application 62/958,920 regarding transmitting a set of probe signals S110, receiving a set of reflected probe signals S120, decoding the set of received probe signals S130, evaluating effects of phase variance S140, and/or modifying probe signal characteristics S150; etc.), evaluate and/or compensate for interference (e.g., as described in U.S. patent application Ser. No. 17/323,334, filed 18 May 2021 and titled "SYSTEM AND METHOD FOR RADAR INTERFERENCE MITIGATION", which is herein incorporated in its entirety by this reference; such as described in U.S. patent application Ser. No. 17/323,334 regarding evaluating interference S140 and/or compensating for interference S150), and/or perform any other suitable functions (e.g., any other computing and/or processing functions).

The signal processor 240 preferably includes a one or more processors (e.g., CPU, GPU, microprocessor, microcontroller, FPGA, ASIC, etc.) and/or storage units (e.g., Flash, RAM, magnetic disk drive, etc.), but can additionally or alternatively include any other suitable elements. However, the signal processor 240 can additionally or alternatively perform its functions in any other suitable manner, and/or the system 200 can additionally or alternatively include any other suitable signal processor(s) 240. The signal processor 240 can additionally or alternatively be used to communicate with an external computer (e.g., to offload computations, receive additional data, and/or for any other suitable reason). In some examples, multiple radar sensors of the system 200 share one or more signal processors 240 (e.g., all radar sensors, or a subset thereof, share a single signal processor).

However, the system can additionally or alternatively include any other suitable radar sensors having any suitable elements.

Figure 2B:
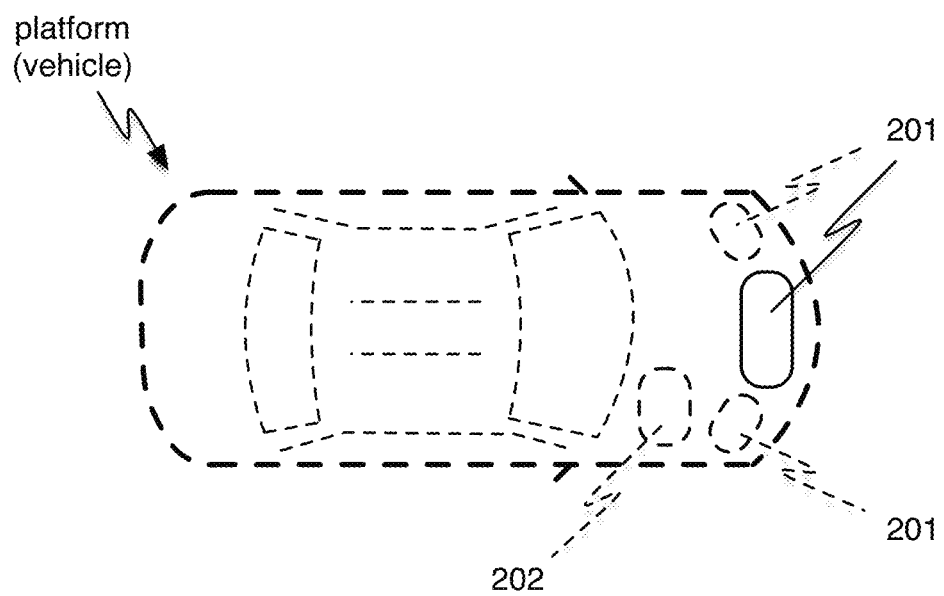
Figure 2C:
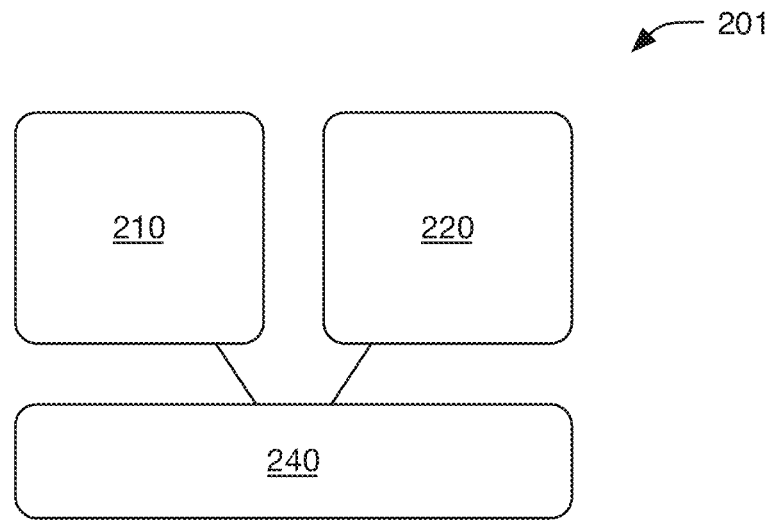
FIG. 2C is a schematic representation of an embodiment of a radar sensor of the system.
Figure 2D:
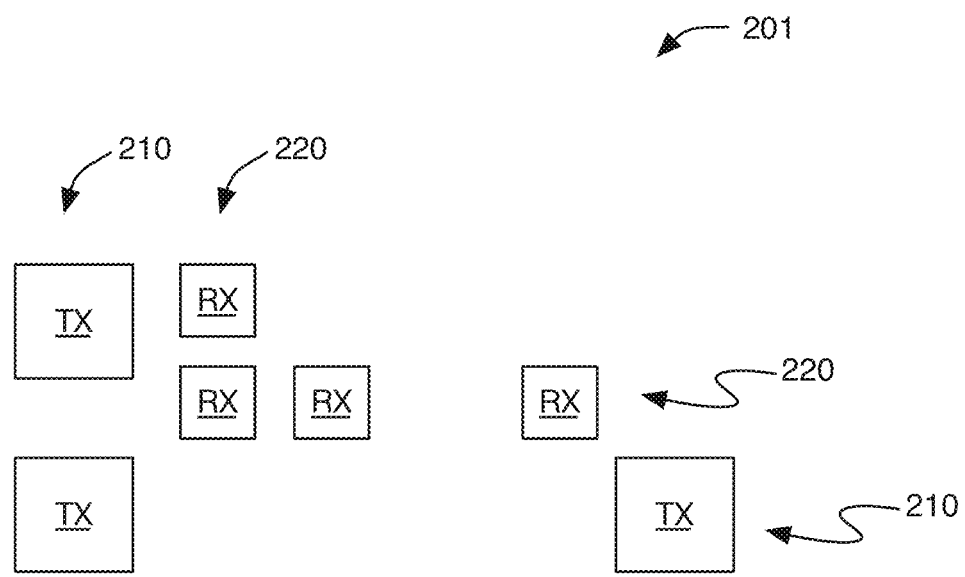
FIG. 2D is a schematic representation of an example of transmitter and receiver arrays of the radar array.

The radar sensors are preferably coupled (e.g., mounted, such as mounted in a fixed or substantially fixed position and orientation) to a vehicle (e.g., as shown in FIG. 2B). The vehicle is preferably a terrestrial vehicle, such as an automobile, but can additionally or alternatively be any other suitable vehicle. However, the radar sensors can alternatively be coupled to any other suitable platform (or platforms) and/or arranged in any other suitable manner. As used herein, terms such as 'egospeed', 'egovelocity', 'egorotation', and the like refer to aspects of the state (e.g., the speed, velocity, and rotation, respectively) of the radar sensor(s) and/or the platform (e.g., vehicle) to which they are coupled.

The system can optionally include one or more auxiliary sensors 202. The auxiliary sensors are preferably coupled to the radar sensors, more preferably having fixed position and orientation relative to the radar sensors, such as being mounted to the same platform (e.g., vehicle) as the radar sensors. However, the auxiliary sensors can additionally or alternatively have any other suitable arrangement with respect to the radar sensors, to each other, and/or to any other elements of the system. In examples, the auxiliary sensors can include one or more position sensors, imaging sensors, inertial sensors, vehicle sensors, odometry sensors, and/or sensors of any other suitable types.

The position sensors can include, in examples, GNSS and/or other geopositioning modules (e.g., receivers for one or more of GPS, GLONASS, BeiDou, Galileo, etc.), local positioning modules (e.g., modules enabling techniques such as triangulation, trilateration, multilateration, etc.), and/or any other suitable position sensors.

The imaging sensors can include, in examples, one or more cameras (e.g., standard, multispectral, visual range, hyperspectral, stereoscopic, etc.), lidar sensors, ultrasound sensors, and/or any other suitable imaging sensors.

The inertial sensors can include, in examples, one or more accelerometers, gyroscopes, altimeters, magnetometers, and/or any other suitable inertial sensors.

The vehicle sensors can include position, motion, and/or odometry sensors associated with the vehicle and/or elements thereof. For example, the vehicle sensors can include steering angle sensors, wheel orientation sensors, wheel rotation sensors (e.g., wheel encoders), and/or any other suitable sensors associated with information indicative of vehicle motion and/or factors affecting vehicle motion. In a specific example, wheel encoders (e.g., measuring rotation of each wheel of a vehicle, such as all four wheels, or a subset thereof) can provide information such as wheel speed, differential slip, and/or any other suitable information associated with wheel position and/or motion. However, the vehicle sensors can additionally or alternatively include any other suitable sensors configured to sample information associated with the state of the vehicle and/or its environment.

However, the system can additionally or alternatively include any other suitable elements in any suitable arrangement.

4. Method

4.1 Receiving Sensor Data

Receiving sensor data S100 preferably functions to receive data indicative of an environment surrounding the sensors. The sensor data received preferably includes radar sensor data (e.g., received from the one or more radar sensors of the system) and can additionally or alternatively include auxiliary sensor data (e.g., received from one or more auxiliary sensors of the system).

S100 is preferably performed repeatedly (e.g., periodically, such as substantially continuously). For example, radar sensor data can be received for each radar frame (e.g., collected periodically, such as at a rate of 10 Hz, 20 Hz, 30 Hz, 40 Hz, 60 Hz, 100 Hz, etc.). However, the radar sensor data and/or other sensor data can additionally or alternatively be received with any other suitable timing.

The radar sensor data is preferably collected, analyzed, and/or otherwise generated such as described in one or more of: U.S. patent application Ser. No. 16/800,906, filed 25 Feb. 2020 and titled "Systems and Methods for Doppler-Enhanced Radar Tracking", U.S. patent application Ser. No. 15/900,682, filed 20 Feb. 2018 and titled "Systems and Methods for 4-Dimensional Radar Tracking", U.S. patent application Ser. No. 16/149,369, filed 2 Oct. 2018 and titled "Systems and Methods for Stereo Radar Tracking", U.S. patent application Ser. No. 16/704,409, filed 5 Dec. 2019 and titled "Systems and Methods for Interpolated Virtual Aperture Radar Tracking", U.S. Patent Application 62/958,920, filed 9 Jan. 2020 and titled "Systems and Methods for Phase-Modulated Radar Detection", and/or U.S. Patent Application 63/034,514, filed 4 Jun. 2020 and titled "Systems and Methods for Virtual Doppler and/or Aperture Enhancement", each of which is herein incorporated in its entirety by this reference.

For example, collecting, analyzing, and/or generating the radar sensor data can include transmitting a set of probe signals S110, receiving a set of reflected probe signals S120, decoding the set of received probe signals S130, and/or any other suitable elements.

Transmitting a set of probe signals S110 preferably functions to transmit signals that, after reflection off of one or more targets, can provide information about those targets (e.g., relative location and/or velocity, etc.). S110 preferably includes transmitting frequency shift keyed (FSK) RADAR signals and/or frequency-modified continuous wave (FMCW) RADAR signals (e.g., defining a plurality of "chirps"). However, S110 can additionally or alternatively include transmitting any other suitable signals. In examples, the signals can include electromagnetic signals (e.g., radio waves in RADAR; infrared, visible, and/or UV light in LIDAR; etc.) and/or sound signals (e.g., as in SONAR). In some embodiments, one or more elements of S110 are performed such as described in U.S. patent application Ser. No. 16/704,409, filed 5 Dec. 2019 and titled "Systems and Methods for Interpolated Virtual Aperture Radar Tracking", which is herein incorporated in its entirety by this reference (e.g., as described in U.S. patent application Ser. No. 16/704,409 regarding transmitting a set of probe signals S110).

In embodiments in which a plurality of chirps are transmitted, each chirp is preferably considered a separate probe signal. However, a probe signal can alternatively include multiple such chirps (e.g., 2, 4, 8, 16, 32, 2-16, 16-64, or more than 64 chirps, etc.), can include only portions of a chirp, and/or can include any other suitable transmitted signal.

The probe signals of the set are preferably generated by a single transmitter. However, the signals can alternatively be generated by multiple transmitters (e.g., defining a multi-transmitter configuration) and/or generated in any other suitable manner. Although some sets of probe signals are referred to herein as probe signals transmitted by a single transmitter, a person of skill in the art will recognize that some or all such sets can alternatively include probe signals transmitted by a particular set of transmitters defining a multi-transmitter configuration. Each signal (e.g., chirp) can have the same or a different configuration from other signals (e.g., of the set, of other sets, etc.), wherein the signal configuration can include aspects such as phase modulation, bandwidth, sampling rate, and/or any other suitable aspects of the signal.

In a first embodiment, the chirps define a regular repeating pattern. For example, the pattern can cycle through each transmitter (or multi-transmitter configuration) in order. In a specific example, each transmitter generates one chirp, then waits for the next cycle. In alternative examples, each transmitter can generate more than one consecutive chirp (e.g., 2, 3, 4, 5-10, or more than 10 consecutive chirps, etc.), some transmitters may generate multiple consecutive chirps whereas other transmitters generate only a single chirp in the cycle, some transmitters may generate a chirp or set of consecutive chirps more frequently than other transmitters (e.g., wherein a cycle of transmissions proceeds in an order such as: TX1, TX2, TX1, TX3 or TX1, TX2, TX1, TX2, TX1, TX3).

In a second embodiment, the chirps define a non-uniform or varying sequence, or a repeating pattern with a long period, such as a period much greater than the product of the time between chirps and the number of transmitters (or multi-transmitter configurations). In this embodiment, the sequence preferably includes one or more sub-sequences of consecutive chirps from a single transmitter. For example, for each transmitter, the sequence can include one or more sub-sequences of consecutive chirps, such as 2, 3, 4, 5, or more consecutive chirps. Such sequences can enable (e.g., when coupled with analysis techniques described herein) higher $V_{max}$ than for typical chirp patterns.

The probe signals preferably include an idle time between chirps (e.g., between all consecutive chirps, whether from the same or different transmitters; between chirps from different transmitters only; between chirps from the same transmitter only; between any other suitable subset of consecutive chirps; etc.). The idle time can be in the range of 5-60% (e.g., 5, 10, 15, 20, 25, 30, 35, 40, 45, 50, 55, 60, 5-15, 10-30, 15-45, and/or 20-60%, etc.), less than 5%, or more than 60% of a characteristic chirp time (e.g., chirp duration, time between subsequent chirp onsets, etc.). In some embodiments, the idle time is a substantially constant duration (e.g., substantially equal idle time between any consecutive chirps). In other embodiments, for example, the idle time can vary, preferably varying between multiples of a minimum idle time, such as 1, 2, 3, 4, and/or 5 times the minimum idle time (and/or any other suitable multiples). In a specific example, the idle time varies between 10%, 20%, and 30% of the chirp duration. The idle time can be varied between consecutive chirps from a single transmitter, consecutive chirps of different transmitters, and/or any other suitable consecutive chirps. For example, the idle time can be varied (e.g., as different multiples of the minimum idle time) between consecutive chirps of the same transmitter, but can always be the minimum idle time between consecutive chirps from different transmitters. Such idle time variations can (e.g., when coupled with analysis techniques described herein) enable higher $V_{max}$ than for a fixed idle time. However, the chirps and/or idle times can additionally or alternatively be controlled in any other suitable manner.

In some embodiments, the bandwidth and rate of frequency change (slope) of the chirps is substantially fixed (e.g., constant for all chirps). However, in some such embodiments, it may not be possible to achieve desired performance in terms of one or more of maximum unambiguous range (e.g., typically limited by slope), maximum unambiguous Doppler velocity (e.g., typically limited by chirp duration), and/or range resolution (e.g., typically limited by bandwidth), because the bandwidth, slope, and chirp duration are coupled; an increase in bandwidth (e.g., to increase range resolution) must be accompanied by an increase in slope and/or chirp duration (e.g., decreasing maximum unambiguous range and/or Doppler velocity). In other embodiments, one or more such characteristics can vary between the chirps. Such variations can enable increases in (e.g., via decoupling of limits on) maximum unambiguous range, maximum unambiguous Doppler velocity, and/or range resolution. In examples, one or more of these characteristics can be varied from a reference value (e.g., typical value, average value, first chirp value, minimum or maximum value, etc.) by factors between 0.1 and 10 (e.g., 0.1, 0.2, 0.3, 0.5, 0.75, 1, 1.5, 2, 3, 4, 5, 10, 0.1-0.3, 0.3-0.7, 0.7-1.3, 1.3-3, 3-6, 6-10, etc.), less than 0.1, and/or greater than 10. The characteristic(s) can be changed between each chirp, changed between sets of multiple chirps, and/or changed with any other suitable timing. The characteristic(s) can be different for all chirps (or all chirps from a particular transmitter, such as wherein the same variation pattern is used independently for each transmitter), changed in a fixed pattern, changed in a dynamically-adjusted manner, and/or changed in any other suitable manner.

In some embodiments, S110 includes imposing phase variance on some or all of the transmissions. This phase variance preferably includes imposing small phase shifts, such as phase shifts less than a threshold magnitude (e.g., 1, 2, 5, 10, 15, 30, 60, or 90 degrees, etc.). The imposed phase variance preferably changes over time (e.g., changing between each chirp, changing between sets of multiple chirps, changing during a chirp such as changing more than once for each chirp, etc.). The phase variance can be imposed uniformly on all the transmitters (or multi-transmitter configurations), can differ between transmitters (or multi-transmitter configurations), or can be imposed in any other suitable manner. The phase shifts can arise from (e.g., be imposed by) phase shifters, time delay elements (e.g., delay lines), changes to transmitted signal chirp characteristics (e.g., chirp bandwidth, start frequency, idle time, etc.), and/or can arise due to any other suitable effects.

In some embodiments, multiple transmitters (or multi-transmitter configurations) can concurrently transmit chirps, representing different probe signals (e.g., differentiated via one or more multiplexing approaches, such as code-division multiplexing, frequency-division multiplexing, Doppler-division multiplexing, etc., such as described by way of example in Sun, Hongbo, Frederic Brigui, and Marc Lesturgie, "Analysis and comparison of MIMO radar waveforms," 2014 *International Radar Conference*, IEEE, 2014, which is herein incorporated in its entirety by this reference). In some such embodiments, phase modulation (e.g., binary phase modulation) can be used to encode the probe signals from each transmitter (or multi-transmitter configuration), preferably such that the concurrently-transmitted probe signals are mutually orthogonal or substantially orthogonal (e.g., enabling subsequent isolation of received signals from a particular TX). Aside from the phase modulation encoding, all other chirp characteristics (e.g., duration, idle time, slope, bandwidth, phase variance, etc.) are preferably identical (or substantially identical) between concurrently-transmitted probe signals. In examples in which phase variance (e.g., as described above) is imposed on concurrently-transmitted chirps, uniform phase variance is preferably superimposed on the phase modulation of each chirp, which can function to maintain orthogonality between the chirps; for example, a 5° phase shift can be imposed uniformly on all chirps, in addition to binary phase modulation used to achieve orthogonality. However, some or all chirp characteristics can alternatively vary between the different concurrent (and/or otherwise temporally-overlapping) chirps.

S110 can be performed continuously, periodically, sporadically, and/or with any other suitable timing. S110 is preferably repeated (e.g., continuously, such as transmitting another set of probe signals immediately or substantially immediately after finishing transmission of a first set of probe signals, etc.), but can alternatively be performed only once. These repetitions can include transmitting the same set of probe signals or different probe signals. For example, the sets can have the same or different transmission sequences, can have the same or different idle times, can have the same or different chirp configurations (e.g., phase modulation, bandwidth, sampling rate, etc.), and/or can differ or be the same in any other suitable manners. The probe signals are preferably transmitted concurrently (or substantially concurrently) with performance of other elements of the method 100 (e.g., S120 and/or S130). For example, the method 100 can include continuously transmitting sets of probe signals S110 while receiving sets of reflected probe signals S120 (e.g., probe signals emitted during the same performance of S110, a previous performance of S110, etc.), and preferably while decoding the sets of received probe signals S130.

However, S110 can additionally or alternatively include transmitting the set (or sets) of probe signals in any other suitable manner.

Receiving a set of reflected probe signals S120 preferably functions to determine information associated with reflections (e.g., from targets in the environment) of the probe signals transmitted in S110. S120 preferably includes determining (e.g., measuring) phase, magnitude, and/or frequency information from reflected probe signals ("return signals" or "returns"), but S120 may additionally or alternatively include measuring any available characteristics of the returns. S120 preferably includes determining any data necessary to recover signal identification information (e.g., information for determining which signal, such as which signal of a signal group or of the transmitted set, the reflected probe signal corresponds to). S120 can optionally include phase shifting some or all of the received signals (e.g., using phase shift elements associated with the receivers), and/or processing the received signals in any other suitable manner.

Each receiver element preferably generates a receiver signal in response to incidence of a radar signal (e.g., reflected probe signal) on it. The receiver elements can generate the receiver signals independently (e.g., wherein each receiver element generates a separate signal based only on radar signals incident on it) and/or in cooperation with other receiver elements (e.g., wherein a group of receiver elements can generate a single signal, or multiple signals, based on radar signals incident on any or all of them). However, the receiver elements can additionally or alternatively generate any other suitable signals.

In some embodiments, signals transmitted by different transmitter elements are received by different receiver elements (e.g., different subsets of the receiver elements of the system 200). For example, in embodiments in which the system 200 includes a different set of receiver elements associated with each transmitter element, the signals transmitted by each transmitter element can be received at the receiver elements of the associated set. However, the returns can additionally or alternatively be received by any other suitable receiver elements.

S120 can optionally include storing some or all of the received signals (and/or the receiver signals generated in response to signal receipt). The received (and/or generated) signals can be stored at each receiver (e.g., storing signals received by that receiver), stored at a centralized storage element (e.g., associated with a computing element such as the signal processor 240), and/or stored in any other suitable location(s). The stored signals preferably include all returns from a set of transmitted signals (and can optionally include returns from multiple sets). However, S120 can additionally or alternatively include storing any other suitable received signals in any suitable manner.

However, S120 can additionally or alternatively include receiving the set of reflected probe signals in any other suitable manner.

The method can optionally include decoding the set of received probe signals S130. For example, S130 can be performed in embodiments in which the transmitted and/or received probe signals are encoded, such as using a phase encoding (e.g., as described above in more detail, such as regarding S110) and/or temporal encoding. Decoding the set of received probe signals S130 can function to convert the received signals (e.g., encoded signals) into signals that can be used to determine information (e.g., relative position and/or velocity) about the targets off of which the signals were reflected.

S130 preferably includes one or more elements such as described in U.S. Patent Application 62/958,920, filed 9 Jan. 2020 and titled "SYSTEMS AND METHODS FOR PHASE-MODULATED RADAR DETECTION", which is herein incorporated in its entirety by this reference (e.g., wherein S130 is performed such as described in U.S. Patent Application 62/958,920 regarding "decoding the set of received probe signals S130"). However, S130 can additionally or alternatively include decoding the set of received probe signals in any other suitable manner.

In some examples, S100 can include determining and/or analyzing Doppler information (e.g., based on the reflected radar signals received at the radar sensor(s)) such as described in U.S. patent application Ser. No. 16/800,906, filed 25 Feb. 2020 and titled "SYSTEMS AND METHODS FOR DOPPLER-ENHANCED RADAR TRACKING", which is herein incorporated in its entirety by this reference. For example, the signal(s) can be pre-warped such as described in U.S. patent application Ser. No. 16/800,906 regarding 'producing a set of angle-adjusted frequency outputs S232', which can enable more precise determination of Doppler information (and/or of other information determined based on the Doppler information). However, the radar sensor data can additionally or alternatively be generated in any other suitable manner.

The sensor data (e.g., radar sensor data) received preferably represents one or more time series. The data preferably includes data associated with tracking points through the time series in one or more dimensional spaces.

This tracking preferably includes point tracking in an R-V space, where R represents distance to a point (e.g., from the radar sensor) and V represents one or more velocities associated with that point. The one or more point velocities can be determined based on Doppler data for that point, wherein the velocity is preferably the radial velocity $V_D$ of the point (e.g., relative to the radar sensor), but can additionally or alternatively include one or more derivative velocity values (e.g., presumptive speed s*, such as described below regarding S200; Doppler velocity components, for example $V_D^h$ and/or $V_D^v$, such as described below regarding S300; etc.) and/or any other suitable velocity.

The sensor data can additionally or alternatively include point tracking in position space (relative to the sensor), such as represented by position in spherical coordinates (e.g., radial distance R, polar angle θ, and azimuthal angle φ) and/or any other suitable coordinate system, and/or tracked in any other suitable spaces.

However, S100 can additionally or alternatively include receiving any other suitable sensor data in any suitable manner.

4.2 Determining Egospeed

Figure 1B:
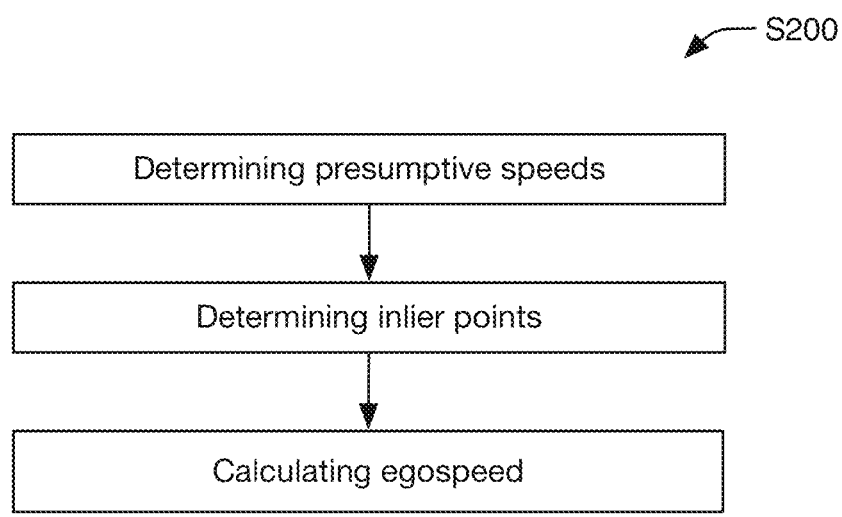
FIG. 1B is a schematic representation of an embodiment of an element of the method.

Determining egospeed S200 preferably functions to determine the speed of the radar sensors (e.g., and of the platform they are mounted to) relative to the environment. S200 is preferably performed based on the radar data received in S100, but can additionally or alternatively be performed based on any other suitable information. S200 preferably includes determining presumptive speeds, determining inlier points, and calculating egospeed (e.g., as shown in FIG. 1B), but can additionally or alternatively include any other suitable elements.

S200 is preferably performed in response to receipt of radar sensor data (e.g., performed for each radar frame, performed for groups of radar frames such as groups of five or ten consecutive radar frames, etc.). However, S200 can additionally or alternatively be performed periodically (e.g., pseudo-continuously), sporadically, in response to one or more triggers (e.g., associated with sensor data received in S100), and/or with any other suitable timing.

Figure 3A:
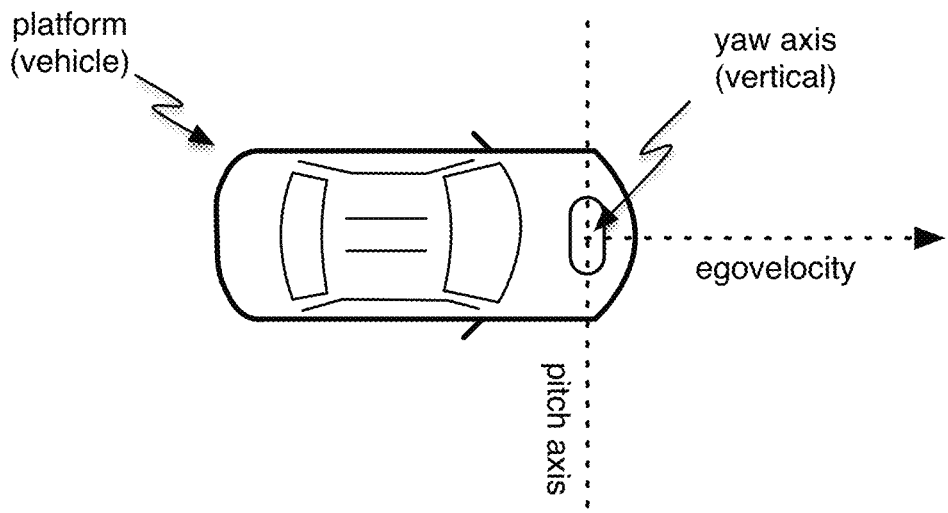
FIGS. 3A-3B are schematic representations of example rotation axes and center planes, respectively, of an embodiment of the system.
Figure 3B:
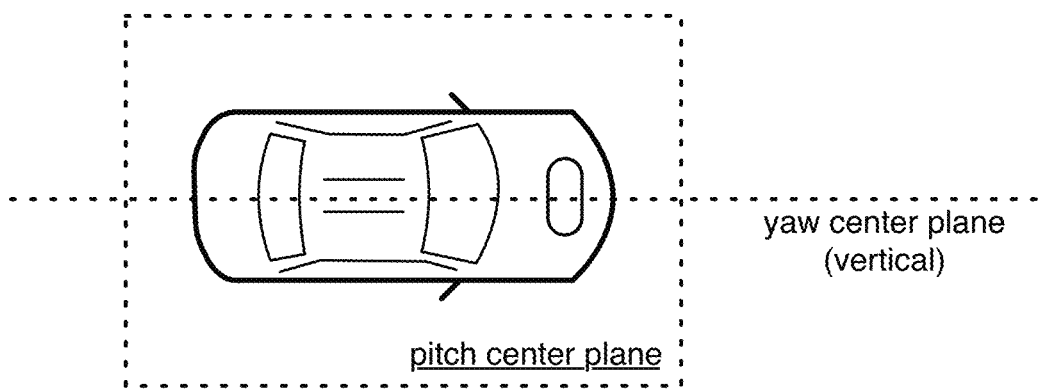
Figure 3C:
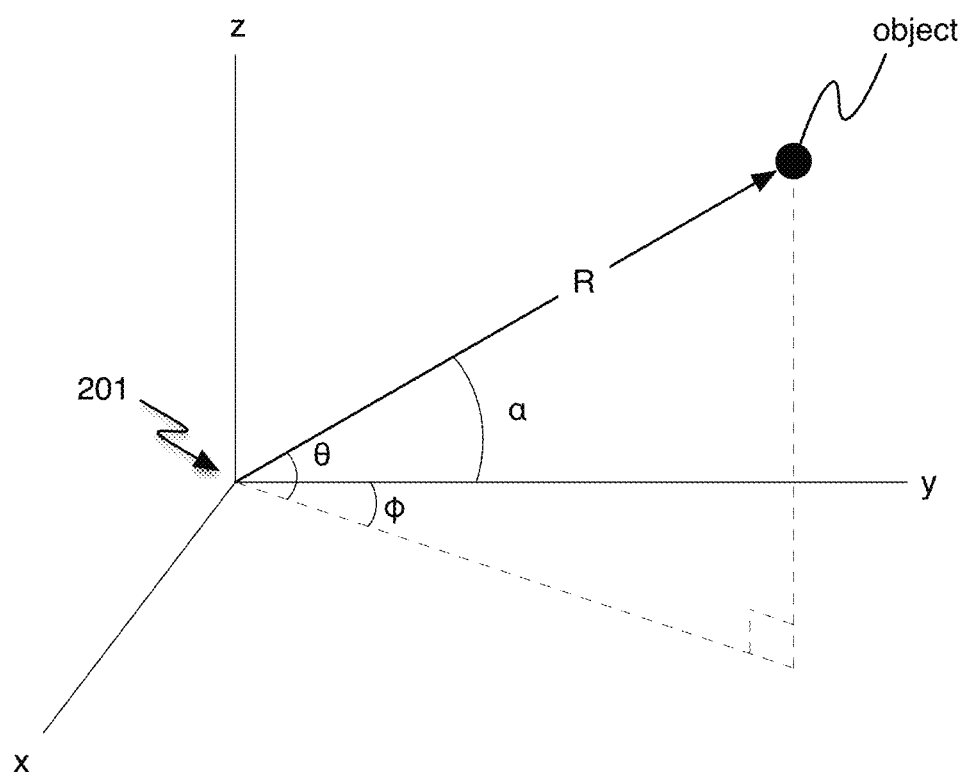
FIG. 3C is a schematic representation of example reference axes, planes, and angles of an embodiment of the system.

Determining presumptive speeds preferably includes determining a respective presumptive speed s* for each point represented in the radar sensor data. For each point, the presumptive speed can be determined based on the radial velocity $V_D$ of the point and the composite angle α (defined between the point, the radar sensor, and the egovelocity, such as shown in FIGS. 3C and/or 4B), wherein s*=$V_D$/cos α; for points substantially in a horizontal plane (e.g., ground plane, horizontal plane intersecting the radar sensor, etc.), a can be equivalent (or substantially equivalent) to the azimuthal angle φ (e.g., in situations in which the egovelocity is parallel to the horizontal plane and oriented at φ=0, such as wherein the egovelocity is forward with respect to the radar sensor and/or vehicle orientation). This presumptive speed calculation implicitly assumes that each point is stationary in the environment (or, at least, has velocity parallel the radar sensor egovelocity), although this assumption is not necessarily correct for every point (e.g., points associated with objects moving in the environment, such as pedestrians, other vehicles, etc.).

Determining inlier points is preferably performed with respect to the calculated presumptive speed. For example, the set of inlier points can be determined by selecting the largest point cluster with respect to s*. However, any other suitable technique for selecting inliers and/or eliminating outliers can be employed. The inlier points will typically correspond to substantially stationary objects in the environment. In contrast, the outlier points will typically correspond to moving objects, for which the calculated value s* is likely not equal to their true speed.

Calculating the egospeed is preferably performed based on the inlier points (e.g., based on the presumptive speed values associated with the selected set of inlier points). This calculation preferably includes determining a measure of central tendency (e.g., mean, median, mode, etc.) of s* for the inlier points. For example, the egospeed $S_{ego}$ can be determined to be equal to the average value of s* for the inlier points. However, the inlier points can additionally or alternatively be used to calculate the egospeed in any other suitable manner.

In some embodiments, S200 can include determining egospeed (or information including egospeed, such as egovelocity) such as described in U.S. patent application Ser. No. 17/328,693, filed 24 May 2021 and titled "SYSTEMS AND METHODS FOR VIRTUAL DOPPLER AND/OR APERTURE ENHANCEMENT", which is herein incorporated in its entirety by this reference (e.g., as described in U.S. patent application Ser. No. 17/328,693 regarding 'analyzing the set of received probe signals S130', such as regarding determining egomotion).

Additionally or alternatively, the egospeed can be determined based on auxiliary sensor information (e.g., wheel speed information, IMU information, GPS information, etc.). For example, information sampled by encoders (and/or any other suitable sensors) on one or more wheels of the vehicle can provide information indicative of vehicle speed (e.g., as well as other information, such as wheel slip). In some embodiments, this 'auxiliary' egospeed (i.e., egospeed determined based on auxiliary sensor information) can be used to determine (and/or confirm, refine, etc.) the composite angle α to one or more points from which radar returns have been received (e.g., the inlier points described above or a subset thereof). For example, a presumptive composite angle α* can be calculated for each point (or a subset thereof), such as based on the relation s=$V_D$/cos α* (where s is the egospeed and $V_D$ is determined based on Doppler information). In some examples, an estimate $\tilde{\alpha}$ of the composite angle can also be determined (for each point, or a subset thereof), such as based on radar signal phase information from multiple transmitter elements and/or receiver elements, and points for which α* is sufficiently close to $\tilde{\alpha}$ can be determined to be substantially stationary inliers (for which α* may be a more precise measure of the composite angle than $\tilde{\alpha}$ is).

However, S200 can additionally or alternatively include determining any other suitable information based on the egospeed, and/or can include determining egospeed in any other suitable manner.

4.3 Determining Egorotation

Determining egorotation rate S300 preferably functions to determine the rotation (and/or rotation rate) of the radar sensors (e.g., and of the platform they are mounted to) about one or more axes. This can include calculating egorotation about any suitable rotation axes. In some embodiments, S300 can include determining a "parallel egorotation component" (about an axis parallel to the egovelocity) and/or one or more "orthogonal egorotation components" (about any axes not parallel or not substantially parallel to the egovelocity); in some such embodiments, it can include determining the magnitude and orientation of the sum of the orthogonal egorotation components (referred to as the "total orthogonal egorotation", which is equal to the difference between the total egorotation and the parallel egorotation component).

S300 can include determining one or more orthogonal egorotation components (e.g., determining the total orthogonal egorotation). For any particular subject rotation axis (except for a rotation axis parallel to the egovelocity, corresponding to the parallel egorotation component), the subject rotation axis and the egovelocity define a respective center plane that includes both the rotation axis and the egovelocity vector (e.g., as shown in FIGS. 3A-3B), wherein the origin of the egovelocity vector lies on the rotation axis in question (e.g., the egovelocity vector and all rotation axes intersect at a common origin). For any rotation axis orthogonal to the egovelocity, the corresponding center plane can be referred to for determining the associated orthogonal egorotation component.

In one example in which the egovelocity is forward (e.g., with respect to the vehicle to which the radar sensors are mounted) or substantially forward, a vehicle yaw corresponding to a vertical rotation axis (e.g., axis parallel to the force of gravity acting on the vehicle, axis normal to a vehicle support surface such as a road, axis normal to a vehicle reference plane such as a horizontal plane, etc.) and/or a vehicle pitch corresponding to a pitch rotation axis (e.g., axis perpendicular to both the vertical rotation axis and the forward egovelocity direction) can be calculated as described herein. However, S300 can additionally or alternatively be performed to determine vehicle roll (e.g., about a forward axis associated with the vehicle, such as an axis parallel to the forward egovelocity direction) and/or rotation about any other suitable axes, and/or can be performed to determine vehicle rotation under any other suitable egovelocity condition (e.g., for an egovelocity that is not substantially forward with respect to the vehicle). The determination can be performed for multiple rotation axes, each associated with a different center plane (e.g., performed by independent performance of S300 for each rotation axis, performed by joint performance of some elements of S300 and independent performance of other elements, etc.).

S300 is preferably performed in response to receiving radar sensor data and/or determining egospeed (e.g., performed for every radar frame and/or every performance of S200, performed for a subset of radar frames, performed in response to one or more trigger events, etc.). However, S300 can additionally or alternatively be performed with any other suitable timing.

S300 preferably includes comparing, between two frames of a time series, the Doppler data associated with one or more points. The points are preferably tracked in the R-V space, and this comparison is preferably only performed using stationary points (e.g., the inlier points selected in S200). The comparison is preferably performed between consecutive frames of the time series (e.g., corresponding to consecutive radar frames), which can be denoted as frames k and k−1. However, the comparison can additionally or alternatively be made between any two suitable frames. The change in Doppler data between frames is indicative of a corresponding egorotation (and thus, along with the time between the frames, an egorotation rate).

In a first embodiment, egorotation is known (or assumed) to be negligible (e.g., substantially equal to zero) about all axes except one (e.g., all non-yaw egorotation is negligible). In this embodiment, the center plane corresponds to egorotation about the remaining axis (e.g., the axis about which egorotation is not necessarily known or assumed to be negligible).

Figure 4A:
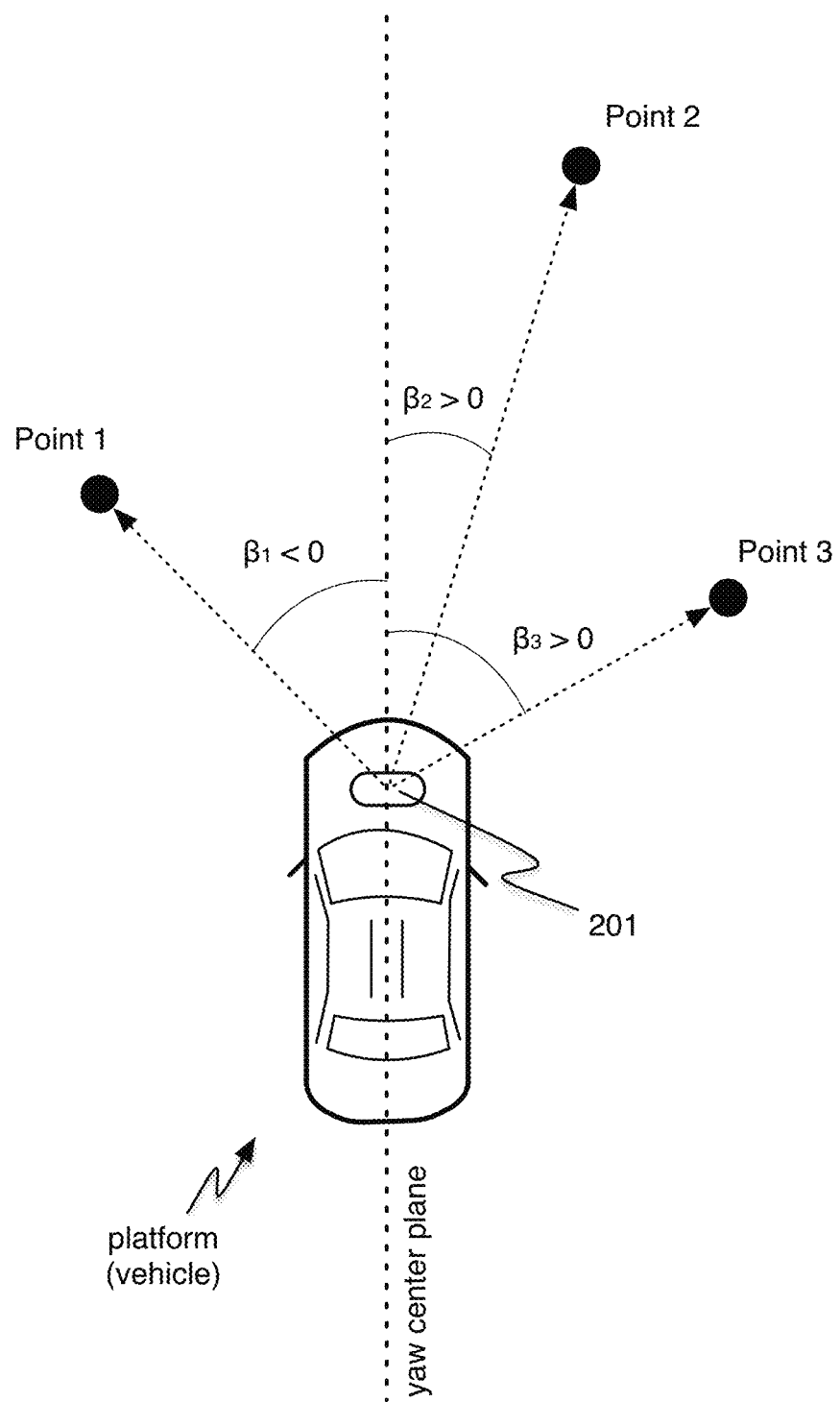
FIG. 4A is a schematic representation of points in an environment of an embodiment of the system.

In this first embodiment, for each point, a value indicative of the change in orientation about the rotation axis can be determined based on the change in radial velocity and on the angle $\beta$ between the center plane and the point (e.g., the angle between the center plane and a vector directed from the radar sensor to the point, wherein angles to points on one side of the plane are denoted as negative and angles to points on the other side of the plane are denoted as positive, as shown by way of example in FIG. 4A); for yaw calculation (wherein the rotation axis is vertical), $\beta$ can be equivalent to the polar angle $\theta$. The indicative values from multiple points (e.g., all tracked stationary points) can be combined (e.g., by determining a measure of central tendency, such as an average) to determine an amount of egorotation about the rotation axis.

An example of this rotation calculation is described herein. For this calculation, the rotational axis is defined as passing through the radar sensor, and the radar sensor is directed parallel to the egovelocity (e.g., the egovelocity is normal or substantially normal to a line or plane defined by antennae of the radar sensor). In a specific example in which the radar sensor is affixed to an automobile, the egovelocity is assumed to be substantially forward with respect to the orientation of the vehicle (e.g., substantially no drift or slip of the vehicle), and the radar sensor is assumed to be centered on the front of the vehicle and facing forward; however, a mathematical transform can be applied to correct for deviation of radar sensor position and/or orientation with respect to the vehicle or other platform (e.g., as described in Lupfer, S., Rapp, M., Dietmayer, K., Brosseit, P., Lombacher, J., Hahn, M., & Dickmann, J. (2017, March), Increasing FastSLAM accuracy for radar data by integrating the Doppler information, In 2017 *IEEE MTT-S International Conference on Microwaves for Intelligent Mobility (ICMIM)* (pp. 103-106), IEEE, which is herein incorporated in its entirety by this reference, such as described regarding equation 5 of Lupfer et al.). Further, with respect to this calculation, the egospeed $S_{ego}$ is assumed to be substantially constant over the time between the frames being compared (e.g., the radar sampling timeframe, such as 10 Hz, 20 Hz, 30 Hz, 40 Hz, 50 Hz, 60 Hz, 100 Hz, etc.).

In one example, each of the points considered (e.g., each inlier point) can be assigned to one of two groups. For each point, the change in radial velocity between frames and k is $\Delta V_D = V_D^{\{k\}} - V_D^{\{k-1\}}$. Points for which $\Delta V_D < 0$ (for which the radial velocity decreases from the first frame to the second frame) can be assigned to a first group, and points for which $\Delta V_D > 0$ (for which radial velocity increases from the first frame to the second frame) can be assigned to the second group. For each point i of the first group, the indicative value $\gamma_i$ is calculated as $$\gamma_i = \Delta V_{D,i}/S_{ego}\sin\beta_i$$

(wherein, for $\Delta V_{D,i}$ between frames k–1 and k, $\beta_i$ is preferably determined based on the point position in frame k, but alternatively based on the point position in frame on an average between the two, and/or based on any other suitable information indicative of the point position), and for each point j of the second group, the indicative value $\gamma_j$ is calculated as $$\gamma_j = \Delta V_{D,j}/S_{ego}\sin\beta_j$$

(wherein, for $\Delta V_{D,i}$ between frames k–1 and k, $\beta_j$ is preferably determined based on the point position in frame k–1, but alternatively based on the point position in frame k, on an average between the two, and/or based on any other suitable information indicative of the point position). Accordingly, for a first group including I total points and a second group including J total points, the egorotation $\gamma$ can be calculated as the average of the indicative values:

$$\gamma = \frac{1}{I+J}\left(\sum_{i=1}^{I} \gamma_i + \sum_{j=1}^{J} \gamma_j\right).$$

And, assuming a substantially constant egorotation rate $\omega$ during the time t between frames k–1 and k, this rate can be calculated as $\omega=\gamma/t$.

In some examples of this embodiment, the egorotation may additionally include a parallel egorotation component, which may not alter (or substantially alter) the egorotation determinations (for one or more orthogonal egorotation components) made based on Doppler information as described above regarding this embodiment. For example, if the egovelocity is forward, the egorotation may include a yaw component (the orthogonal egorotation component), which can be determined as described above, and a roll component (the parallel egorotation component), which can be determined as described below regarding spatial tracking-based determination (or can alternatively be determined in any other suitable manner, or not be determined), but no pitch component (or only a negligible pitch component).

In a first variation of this embodiment, the orientation of the total orthogonal egorotation may not be along one of primary axes described above (e.g., the total orthogonal egorotation vector may not lie along the yaw or pitch axis, but rather along a linear combination of the two), but the orientation is known (e.g., based on auxiliary sensor data). In this variation, the center plane and angle $\beta$ can be defined based on this known orientation, and the total orthogonal egorotation can be determined such as described above (e.g., in an analogous manner to determining the yaw under zero-pitch conditions).

In a second variation of this embodiment, the egorotation is determined in the absence of assumptions or knowledge about the components thereof (e.g., without assuming that a particular component thereof is negligible, without knowledge of the orientation of the total orthogonal egorotation vector). In this embodiment, there can be two non-negligible orthogonal egorotation components (e.g., pitch and yaw components), wherein the associated rotation axes are orthogonal to each other (in addition to being orthogonal to the egovelocity). Both of these components will contribute to the point-specific changes in radial velocity between the two frames. However, as long as the radar data includes both radial velocity and 2-D angle information (e.g., azimuth and elevation) for multiple objects distributed throughout the environment, the system of equations defined thereby can enable determination of the orientation and magnitude of the total orthogonal egorotation (or analogously, determination of both orthogonal egorotation components). For example, this determination can include determining the orthogonal egorotation orientation for which there exists an orthogonal egorotation magnitude that comes closest to satisfying the equation $$\gamma = \Delta V_D/S_{ego} \sin\beta$$

(as described above) for each point.

In examples in which the parallel egorotation component (e.g., roll) is non-zero, this component can be determined based on changes in the positions of the objects in the environment (e.g., as described below regarding the second embodiment). Based on these position changes (e.g., and on the orthogonal egovelocity, determined as described above and/or in any other suitable manner), S300 can include determining a parallel egorotation component that is consistent with (e.g., that would lead to) these position changes. However, this component can alternatively be determined in any other suitable manner (or can alternatively not be determined).

In a second embodiment, some or all egorotation components (e.g., pitch, roll, and yaw, a subset thereof, and/or any other suitable rotation components) can be determined based on changes in the positions of the objects in the environment. For example, the position changes can be determined based on spatial tracking, such as azimuth-elevation tracking or 3-D point tracking, or based on tracking that includes both angle and velocity (e.g., radial velocity), such as azimuth-elevation-velocity tracking or 4-D point tracking (e.g., including azimuth, elevation, range, and velocity), rather than on R-V tracking. Based on these position changes, S300 can include determining the egorotation that is consistent with (e.g., that would lead to) these position changes.

S300 can be performed based on range, radial velocity, angle (e.g., 2-D angle such as azimuth and elevation, i-D angle component such as azimuth or elevation, etc.) and/or any other suitable information associated with the points from which radar returns are received. This information is preferably determined based on the radar returns (but can additionally or alternatively be determined based on auxiliary sensor information and/or determined in any other suitable manner).

In some embodiments, angle information is determined based on phase information. For example, using a radar sensor with multiple receiver elements and/or transmitter elements, the phase differences between signals associated with (e.g., received at or transmitted from) these different receiver elements can be used to determine the angle(s) (e.g., elevation and/or azimuth) to the points in question. In some examples, these determinations are made such as described in one or more of: U.S. patent application Ser. No. 16/704, 409, filed 5 Dec. 2019 and titled "SYSTEMS AND METHODS FOR INTERPOLATED VIRTUAL APERATURE RADAR TRACKING", U.S. patent application Ser. No. 17/324,963, filed 19 May 2021 and titled "SYSTEMS AND METHODS FOR PHASE-MODULATED RADAR DETECTION", U.S. patent application Ser. No. 17/328,693, filed 24 May 2021 and titled "SYSTEMS AND METHODS FOR VIRTUAL DOPPLER AND/OR APERTURE ENHANCEMENT", and/or U.S. patent application Ser. No. 17/323,334, filed 18 May 2021 and titled "SYSTEM AND METHOD FOR RADAR INTERFERENCE MITIGATION", each of which is herein incorporated in its entirety by this reference. However, the phase-based determinations can additionally or alternatively be performed in any other suitable manner.

Additionally or alternatively, angle information can be determined based on Doppler information. For example, if the egospeed is known (e.g., based on auxiliary sensor information), then the composite angle $\alpha$ can be determined based on the egospeed and the Doppler information, following from the equation $S_{ego}=V_D/\cos\alpha$. In some embodiments, one of the polar angle measurements (e.g., azimuthal angle $\phi$ or elevation angle $\theta=0$) may already be known (e.g., from independent information such as auxiliary sensor information), and so the composite angle $\alpha$ can be used (along with this information) to determine the unknown polar angle. For example, for points substantially in a horizontal plane (e.g., ground plane, horizontal plane intersecting the radar sensor, elevation angle $\theta=0$, etc.), a can be equivalent (or substantially equivalent) to the azimuthal angle $\phi$ (e.g., in situations in which the egovelocity is parallel to the horizontal plane and oriented at $\phi=0$, such as wherein the egovelocity is forward with respect to the radar sensor and/or vehicle orientation). This information can then be used to determine the total egorotation (e.g., as described above), such as determining all three orthogonal components of the egorotation.

However, in other embodiments, the single composite angle $\alpha$ may not be sufficient to perform all desired analysis (e.g., to determine the total egorotation), and none of the component angles may be known (e.g., known at all, known with sufficient precision for this application, etc.). In some such embodiments, the Doppler information can be used to directly determine the angular position (e.g., both the azimuth and elevation) of each point. The Doppler information can optionally be determined and/or analyzed such as described in U.S. patent application Ser. No. 16/800,906, filed 25 Feb. 2020 and titled "SYSTEMS AND METHODS FOR DOPPLER-ENHANCED RADAR TRACKING", which is herein incorporated in its entirety by this reference; for example, the signal can be pre-warped such as described in U.S. patent application Ser. No. 16/800,906 regarding 'producing a set of angle-adjusted frequency outputs S232'. However, the Doppler information can additionally or alternatively be determined and/or analyzed in any other suitable manner.

In some embodiments, S300 can include generating a constructed signal S305. For a radar sensor including multiple transmitter elements and/or receiver elements, Doppler information collected over time and associated with different sensor positions (e.g., associated with signals transmitted from different transmitter elements and/or received at different receiver elements) can be combined (e.g., by selecting data associated with different sensor elements at different times) to determine different spatial components (e.g., horizontal and vertical components) of the object's radial velocity. For example, combining the information can include selecting portions (preferably consecutive portions) of information sampled by different sensor elements (preferably adjacent elements) to generate a new constructed signal (e.g., selecting the first chirp from the first receiver, then the second chirp from the second receiver, then the third chirp from the third receiver, then the fourth chirp from the fourth receiver, then repeating this selection pattern multiple times, beginning with the fifth chirp from the first receiver, etc.). In some examples, this can include performing a spatial-temporal Fourier transform (e.g., performing an FFT based on this constructed signal. The Doppler information is preferably combined over a timescale shorter than or equal to a radar frame (e.g., using one chirp at a time from each transmitter or receiver, using a fraction of a chirp at a time from each, using a small number of chirps or fractions thereof at a time from each, etc.).

Figure 5:
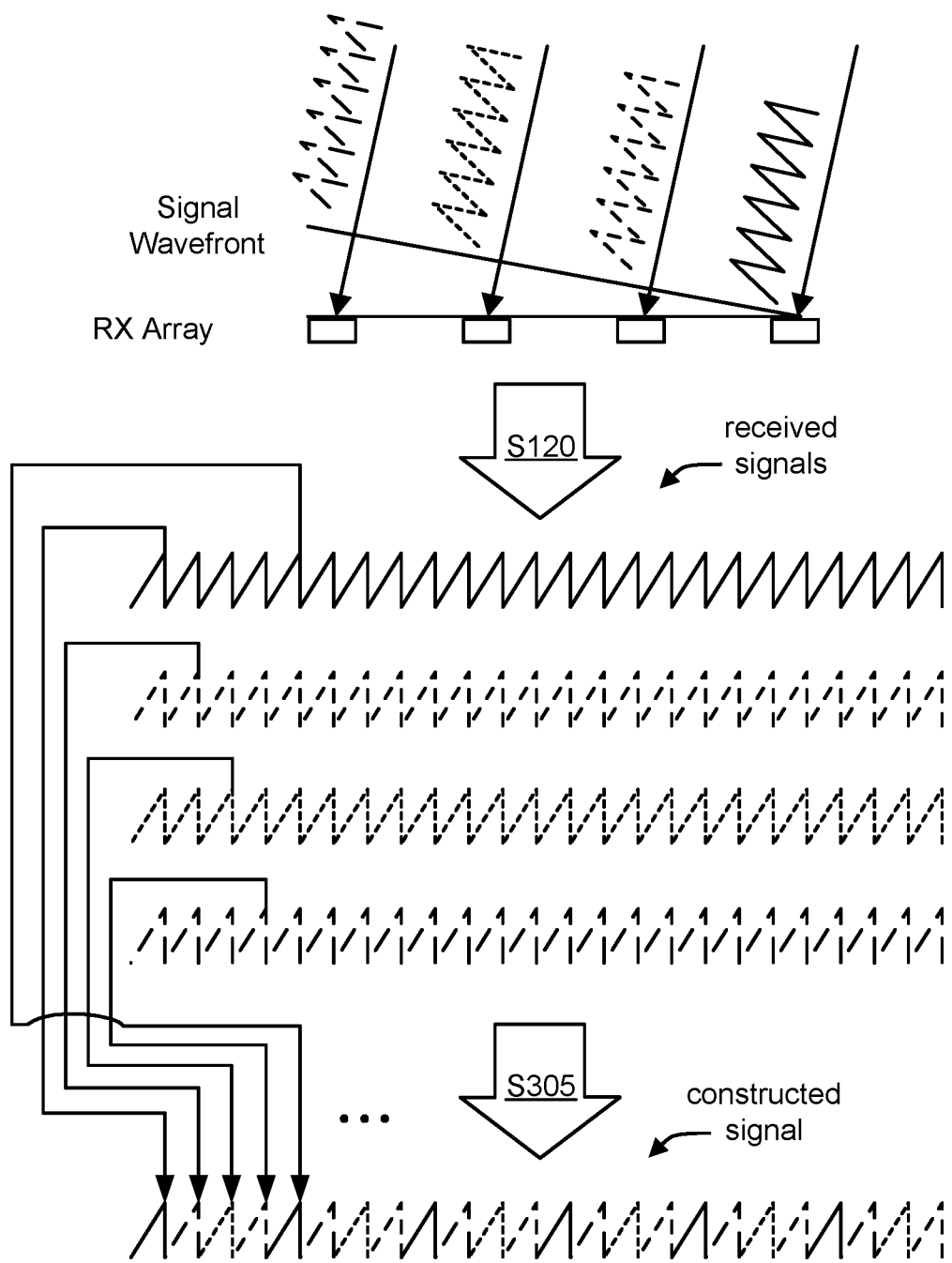
FIG. 5 is a schematic representation of an example of elements of an embodiment of the method.
Figure 6:
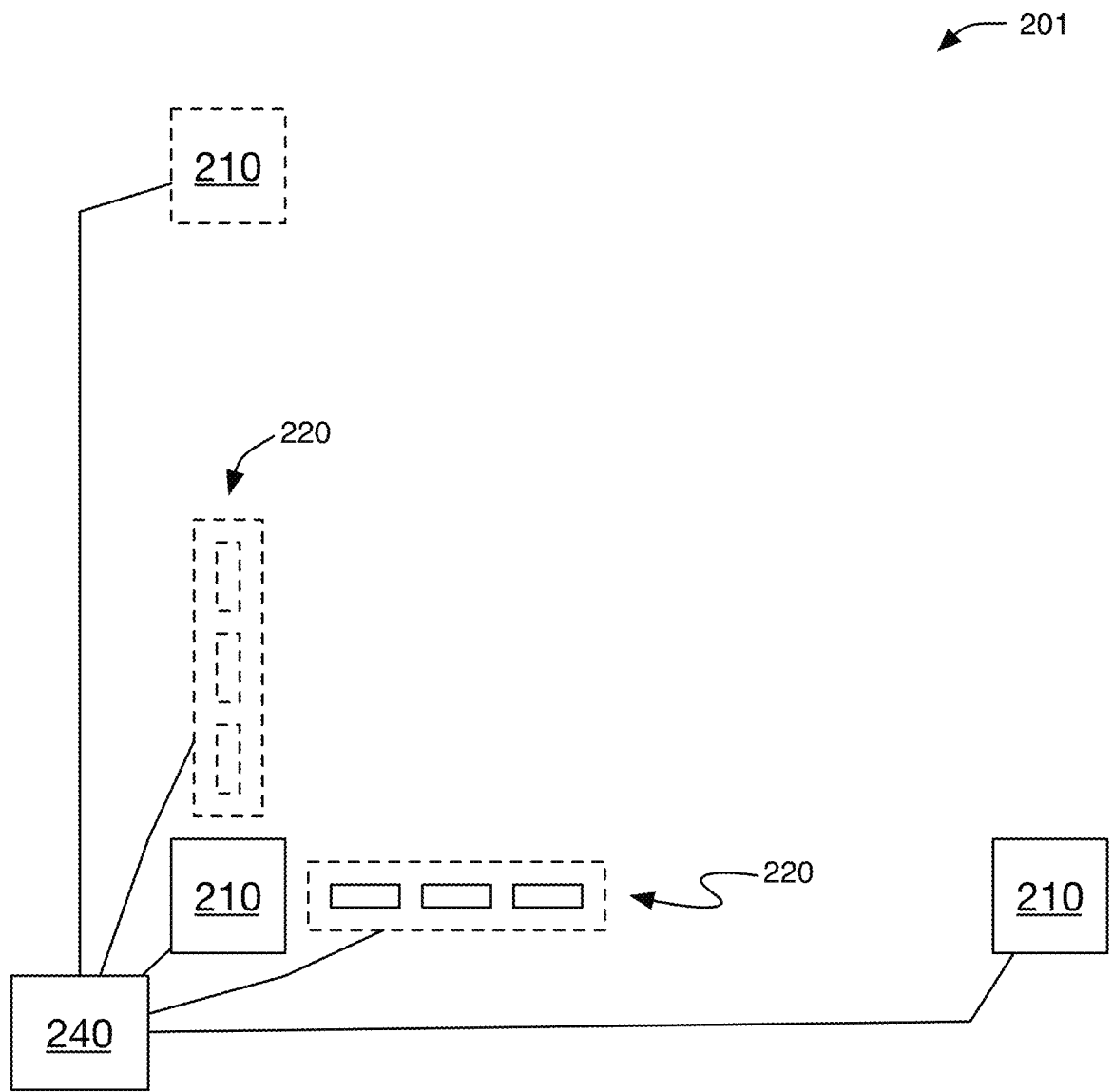
FIGS. 6-7 are schematic representations of a first and second example, respectively, of the system.
Figure 7:
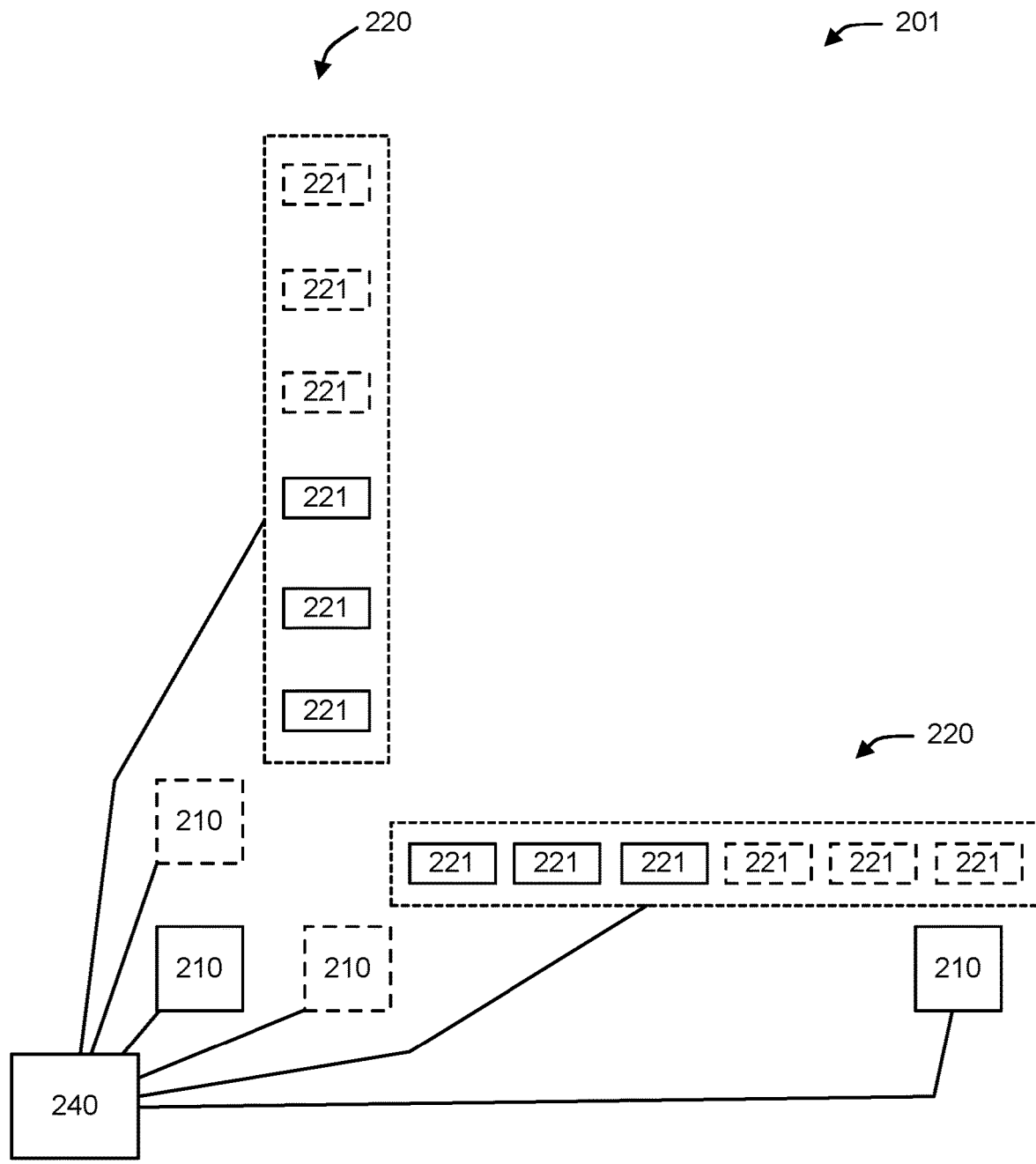

In one embodiment, a radar sensor includes a first receiver array (e.g., arranged substantially along a first axis, such as a horizontal axis, a vertical axis, or any other suitable axis). For example, the radar sensor can have egovelocity directed substantially along an egovelocity axis (e.g., y-axis), and the first axis (e.g., x-axis) is preferably not parallel the egovelocity axis (possibly, but not necessarily, orthogonal the egovelocity axis). By combining Doppler information from different sensor positions (e.g., selecting consecutive portions from adjacent receiver elements, such as described above), a new signal can be constructed (e.g., as shown in FIG. 5), wherein the new signal can be indicative of a radial velocity component (e.g., component oriented substantially parallel the first axis, component substantially orthogonal to the first axis, or a linear combination thereof; representative of a projection of the radial velocity onto a first reference plane, such as a plane including the first axis and the egovelocity axis; etc.), also referred to herein as a Doppler velocity component. Regarding FIG. 5, a person of skill in the art will recognize that the chirps of the incoming signals are shown for illustrative purposes only, and are not necessarily shown to scale; the duration of a chirp (e.g., 0.1-100 ms) will typically be much greater than the time difference between the signal wavefront's arrival at different receiver elements of the array (and so the 'lengthscale' of the chirp, equal to the product of the chirp duration and the speed of light in the environment, will typically be much greater than the distance from the signal wavefront to the other receiver elements at the time it intersects the first receiver). In some examples of this embodiment, the radar sensor also includes a second receiver array (e.g., arranged substantially along a second axis, such as a z-axis, which can be a vertical axis or other axis substantially orthogonal to the first axis, but alternatively at an oblique angle thereto or having any other suitable arrangement, and also preferably not parallel the egovelocity axis but not necessarily orthogonal to it); a second new signal can be constructed based on this second array, wherein the second new signal is indicative of a second radial velocity component (e.g., orthogonal to the first radial velocity component; representative of a projection onto a second reference plane, preferably orthogonal to the first reference plane associated with the first radial velocity component, such as wherein the second reference plane includes the second axis and the egovelocity axis; etc.).

Figure 4B:
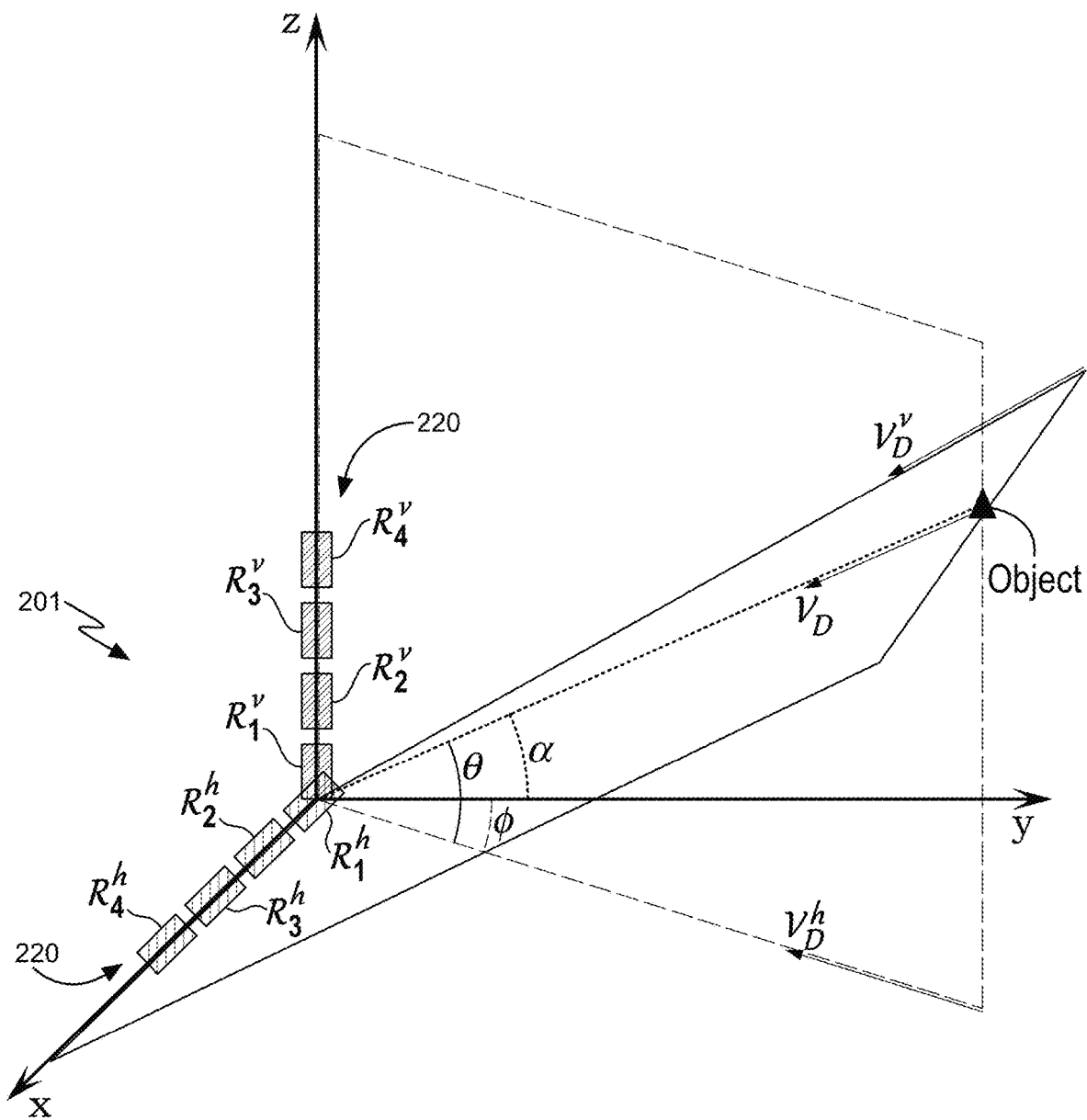
FIG. 4B is a schematic representation of an example of radial velocity components, reference axes, planes, and angles of an embodiment of the system.

In some examples, the constructed signal(s) can be used (e.g., following standard techniques for determining radial velocity based on Doppler information) to determine the first component $V_D^h$ (e.g., component of the radial velocity projected onto the x-y plane, such as the horizontal plane) and/or the second component $V_D^v$ (e.g., component of the radial velocity projected onto the y-z plane, which may be a vertical plane and may be orthogonal to the x-y plane) of the radial velocity (e.g., using a horizontal array of receiver elements to determine the horizontal component, and/or using a vertical array to determine the vertical component). In some such examples, the angular position of the object can be determined based on these components and on the total radial velocity $V_D$ of the point based on the relations $V_D^h = V_D \cos \theta$ and $V_D^v = V_D \cos \phi$. A specific example is depicted in FIG. 4B, in which the elements of the two receiver arrays are indicated by the labels $R_i^h$ and $R_i^v$ for $i \in \{1,2,3,4\}$.

Further, the radar sensor can include any suitable number of receiver elements in any suitable arrangement, and the new signal(s) can be constructed based on signal portions received at these receiver elements or any suitable subset thereof. Analogously, the radar sensor can additionally or alternatively include multiple transmitter elements, and the new signal(s) can be constructed based on signal portions received at these transmitter elements or any suitable subset thereof. In some examples, each signal portion is associated spatially with a physical receiver, whereas in other examples, some or all signal portions can be associated with a virtual receiver (e.g., extrapolated or interpolated receiver, such as described in U.S. patent application Ser. No. 16/704,409, filed 5 Dec. 2019 and titled "SYSTEMS AND METHODS FOR INTERPOLATED VIRTUAL APERATURE RADAR TRACKING", and/or in U.S. patent application Ser. No. 17/324,963, filed 19 May 2021 and titled "SYSTEMS AND METHODS FOR PHASE-BASED RADAR DETECTION", each of which is herein incorporated in its entirety by this reference.

However, the Doppler information can additionally or alternatively be used in any other suitable manner to determine the angular positions of the objects, and/or the angular positions can additionally or alternatively be determined in any other suitable manner.

In some examples, S300 can include estimating whether the egorotation rate is substantially nonzero (e.g., by examining variance of the radial velocity and/or change in radial velocity of the inlier points), and can perform full calculation of the egorotation rate (e.g., as described above) in response to determining that the egorotation rate may be substantially nonzero (e.g., the variance of radial velocity and/or change in radial velocity exceeds a threshold value).

However, the egorotation rate can additionally or alternatively be calculated in any other suitable manner.

In some embodiments, an analogous approach can optionally be employed to perform radar sensor calibration. The mounting angle and/or position of the radar sensor or sensors can result in differences in the collected data. Accordingly, registration between multiple radar sensors can be determined based on these differences (e.g., wherein the data received from each sensor should be indicative of the same egospeed and egorotation, since the sensors are fixed to the same vehicle and so any differences in the calculated egospeed and egorotation can be attributed to deviations in sensor position and orientation relative to the expected values). Further, if the vehicle position and orientation is known (e.g., based on auxiliary sensor data), this information can be used to provide absolute sensor position and orientation correction (e.g., for one or more radar sensors) and/or to further refine the sensor registration described above. For example, the mathematical transform required to generate data corresponding to a radar sensor mounted in a centered and forward-facing position and orientation can be determined based on comparison of the radar sensor data and auxiliary sensor data. However, radar sensor calibration can additionally or alternatively be performed in any other suitable manner and/or may be omitted from the method.

4.4 Performing SLAM

Performing SLAM S400 preferably functions to determine a map of the environment around the sensor or sensors and to determine the position and orientation of the sensor within the environment. The SLAM process is preferably performed based on the egospeed and egorotation information determined in this method (e.g., as described above, such as regarding S200 and/or S300). The SLAM process can optionally be performed based further on additional sources of information. In a first example, such additional information sources can include information determined based on radar point matching, preferably performed based on radar point clouds defined in position space (e.g., points tracked between radar frames based on position information). The additional information sources can optionally include auxiliary sensor data and/or derivatives thereof. However, the additional information sources can additionally or alternatively include any other suitable information.

S400 can optionally include combining information from multiple sources using one or more approximate solution methods. For example, the information can be combined using a particle filter, Kalman filter and/or variant thereof (e.g., extended Kalman filter, unscented Kalman filter, hybrid Kalman filter, etc.), and/or any other suitable methods. S400 is preferably performed repeatedly (e.g., periodically, such as continuously or pseudo-continuously) based on updated information received from repetition of other elements of the method (e.g., S100, S200, and/or S300), but can additionally or alternatively be performed with any other suitable timing.

However, S400 can additionally or alternatively include performing simultaneous localization and mapping in any other suitable manner and/or with any other suitable timing, and/or the method for radar-based simultaneous localization and mapping can additionally or alternatively include any other suitable elements performed in any suitable manner. Further, a person of skill in the art will recognize that the method can additionally or alternatively include performing localization and mapping at separate times (e.g., performing one and then performing the other based on the results of the first), or performing only localization or mapping without performing the other. Further, in some embodiments, the method can include receiving mapping information (e.g., previously-determined information, such as known maps), and can include performing localization and/or mapping (e.g., to verify, refine, and/or correct the received mapping information) based on this received mapping information (e.g., as well as based on the information described above, such as based on the egospeed, egorotation, radar information, and/or auxiliary sensor information, etc.).

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for radar-based localization, comprising:
   transmitting a first radar probe signal, wherein the first radar probe signal is reflected by a plurality of targets in an environment surrounding a radar sensor to generate a first set of reflected signals, wherein each reflected signal of the first set is associated with a respective target of the plurality;
   transmitting a second radar probe signal, wherein the second radar probe signal is reflected by the plurality of targets to generate a second set of reflected signals, wherein each reflected signal of the second set is associated with a respective target of the plurality;
   at the radar sensor, receiving the first and second sets of reflected signals;
   based on the first set of reflected signals, determining a first set of Doppler information associated with the plurality of targets;
   based on the second set of reflected signals, determining a second set of Doppler information associated with the plurality of targets;
   determining an egospeed of the radar sensor,
   selecting a first stationary target from the plurality of targets; and
   based on the first and second sets of Doppler information and on the egospeed, determining an egorotation component, about a reference axis, of an egorotation of the radar sensor, wherein determining the egorotation component comprises:
      determining an angular position of a projection of the first stationary target onto a reference plane, wherein the reference plane is normal to the reference axis;
      based on an associated reflected signal of the first set, determining a first radial velocity of the first stationary target;
      based on an associated reflected signal of the second set, determining a second radial velocity of the first stationary target;
      determining a radial velocity difference between the first and second radial velocities; and
      based on the radial velocity difference, the egospeed, and the angular position, determining a first indicative value that is indicative of the egorotation component.

2. The method of claim 1, wherein determining the egospeed is performed based on Doppler information associated with one or more reflected signals received at the radar sensor.

3. The method of claim 2, wherein determining the egospeed is performed based on at least one of the first set of Doppler information or the second set of Doppler information, wherein the one or more reflected signals comprise one or more reflected signals of at least one of the first set of reflected signals or the second set of reflected signals.

4. The method of claim 2, further comprising determining an egovelocity direction, wherein determining the egospeed is performed based further on the egovelocity direction.

5. The method of claim 4, wherein the radar sensor is mechanically coupled to a vehicle that defines a forward orientation, wherein determining the egovelocity direction is performed by estimating that the egovelocity direction is substantially aligned with the forward orientation.

6. The method of claim 4, wherein:
the reference axis is orthogonal to the egovelocity direction;
a second reference axis is orthogonal to the reference axis and to the egovelocity direction;
the method further comprises determining a second egorotation component, about the second reference axis, of egorotation of the radar sensor; and
determining the egorotation component about the reference axis is performed based further on the second egorotation component.

7. The method of claim 6, wherein determining the second egorotation component is performed by estimating that the second egorotation component is substantially zero.

8. The method of claim 6, wherein:
the radar sensor is mechanically coupled to a vehicle;
the egorotation component is yaw; and
the second egorotation component is pitch.

9. The method of claim 1, wherein the first indicative value $\gamma_1$ is equal to $\Delta V_{D,1}/S_{ego} \sin \beta_1$, wherein $\Delta V_{D,1}$ is the radial velocity difference, $S_{ego}$ is the egospeed, $\beta_1$ is the angular position.

10. The method of claim 1, further comprising selecting a plurality of stationary targets from the plurality of targets, wherein the plurality of stationary targets comprises the first stationary target, wherein determining the egorotation component further comprises:
for each stationary target of the plurality, determining a respective indicative value that is indicative of the egorotation component; and
determining a measure of central tendency of the indicative values associated with the plurality of stationary targets.

11. The method of claim 1, wherein:
the radar sensor is mechanically coupled to a vehicle; and
determining the egospeed is performed based on information sampled by an auxiliary sensor of the vehicle.

12. The method of claim 11, wherein the auxiliary sensor is a wheel rotation sensor.

13. The method of claim 1, wherein:
the radar sensor comprises a plurality of receiver elements;
each reflected signal of the first set is received independently at each receiver element of the plurality;
determining the first set of Doppler information comprises:
from the first set of reflected signals, selecting portions of reflected signals received at each receiver element of the plurality;
based on the selected portions, generating a constructed signal; and
based on the constructed signal, determining a radial velocity component associated with a first target of the plurality, wherein the first set of Doppler information comprises the radial velocity component; and
determining the egorotation component comprises:
based on the radial velocity component, determining an angular position of a projection of the first target onto the reference plane; and
based on the angular position and the second set of Doppler information, determining an indicative value that is indicative of the egorotation component.

14. The method of claim 13, wherein:
each reflected signal of the second set is received independently at each receiver element of the plurality;
determining the second set of Doppler information comprises:
from the second set of reflected signals, selecting second portions of reflected signals received at each receiver element of the plurality;
based on the second portions, generating a second constructed signal; and
based on the second constructed signal, determining an updated radial velocity component associated with the first target, wherein the second set of Doppler information comprises the updated radial velocity component;
and
determining the indicative value comprises:
based on the updated radial velocity component, determining an updated angular position of the projection of the first target onto the reference plane;
and
based on a difference between the angular position and the updated angular position, calculating the indicative value.

15. The method of claim 13, further comprising determining a second egorotation component, about a second reference axis, of the egorotation of the radar sensor, wherein the second reference axis is orthogonal to the reference axis.

16. The method of claim 15, wherein:
the radar sensor further comprises a second plurality of receiver elements;
each reflected signal of the first set is received independently at each receiver element of the second plurality;
determining the first set of Doppler information further comprises:
from the first set of reflected signals, selecting second portions of reflected signals received at each receiver element of the second plurality;
based on the second portions, generating a second constructed signal; and
based on the second constructed signal, determining a second radial velocity component associated with the first target, wherein the first set of Doppler information further comprises the second radial velocity component, wherein the second radial velocity component is different from the first radial velocity component; and
determining the second egorotation component comprises:
based on the second radial velocity component, determining a second angular position of a second projection of the stationary target onto a second reference plane, wherein the second reference plane is not parallel the reference plane; and based on the second angular position and the second set of Doppler information, determining the second egorotation component.

17. The method of claim 16, wherein:
the plurality of receiver elements defines a first array substantially aligned along a first axis normal to the reference plane; and
the second plurality of receiver elements defines a second array substantially aligned along a second axis normal to the second reference plane.

18. The method of claim 1, wherein the first and second radar probe signals are transmitted at the radar sensor.

19. The method of claim 1, wherein:
the radar sensor is mechanically coupled to a vehicle; and
determining the egorotation component is performed based further on information sampled by an auxiliary sensor of the vehicle.

20. The method of claim 19, wherein the auxiliary sensor comprises a camera.

21. A method for radar-based localization, comprising:
transmitting a first radar probe signal, wherein the first radar probe signal is reflected by a plurality of targets in an environment surrounding a radar sensor to generate a first set of reflected signals, wherein each reflected signal of the first set is associated with a respective target of the plurality;
transmitting a second radar probe signal, wherein the second radar probe signal is reflected by the plurality of targets to generate a second set of reflected signals, wherein each reflected signal of the second set is associated with a respective target of the plurality;
at the radar sensor, receiving the first and second sets of reflected signals;
based on the first set of reflected signals, determining a first set of Doppler information associated with the plurality of targets;
based on the second set of reflected signals, determining a second set of Doppler information associated with the plurality of targets;
determining an egospeed of the radar sensor; and
based on the first and second sets of Doppler information and on the egospeed, determining an egorotation component, about a reference axis, of an egorotation of the radar sensor, wherein
the radar sensor comprises a plurality of receiver elements;
each reflected signal of the first set is received independently at each receiver element of the plurality; and
determining the first set of Doppler information comprises:
from the first set of reflected signals, selecting portions of reflected signals received at each receiver element of the plurality;
based on the selected portions, generating a constructed signal; and
based on the constructed signal, determining a radial velocity component associated with a first target of the plurality, wherein the first set of Doppler information comprises the radial velocity component; and
determining the egorotation component comprises:
based on the radial velocity component, determining an angular position of a projection of the first target onto a reference plane; and
based on the angular position and the second set of Doppler information, determining an indicative value that is indicative of the egorotation component.

* * * * *